United States Patent
Oizumi et al.

(10) Patent No.: US 10,213,683 B2
(45) Date of Patent: Feb. 26, 2019

(54) GAME CONTROLLER CALIBRATION AND GAME SYSTEM USING GAME CONTROLLER

(71) Applicant: NINTENDO CO., LTD., Kyoto-shi, Kyoto (JP)

(72) Inventors: Toshiki Oizumi, Kyoto (JP); Shinji Takenaka, Kyoto (JP); Takanori Okamura, Kyoto (JP); Shumpei Yasuda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/491,297

(22) Filed: Apr. 19, 2017

(65) Prior Publication Data

US 2018/0193730 A1    Jul. 12, 2018

(30) Foreign Application Priority Data

Jan. 12, 2017  (JP) .................. 2017-003397

(51) Int. Cl.
*A63F 13/211* (2014.01)
*A63F 13/22* (2014.01)
(Continued)

(52) U.S. Cl.
CPC ............ *A63F 13/22* (2014.09); *A63F 13/211* (2014.09); *A63F 13/235* (2014.09); *A63F 13/24* (2014.09);
(Continued)

(58) Field of Classification Search
None
See application file for complete search history.

(56) References Cited

U.S. PATENT DOCUMENTS 5,963,196 A    10/1999  Nishiumi et al.
6,580,418 B1    6/2003  Grome et al.
(Continued)

FOREIGN PATENT DOCUMENTS

JP    2010-137009    6/2010

OTHER PUBLICATIONS

Josh Sutphin, "Doing Thumbstick Dead Zones Right", http://www.third-helix.com/2013/04/12/doing-thumbstick-dead-zones-right.html, Apr. 12, 2013, pp. 1-7 (8 pages).

*Primary Examiner* — Damon Pierce
(74) *Attorney, Agent, or Firm* — Nixon & Vanderhye, P.C.

(57) ABSTRACT

An example game system includes a main body apparatus and a game controller. The game controller has an analog stick, a memory storing correction parameter information including a first manufacturing process correction parameter value determined in a manufacturing process in connection with the analog stick, a first user correction parameter value determined in accordance with an operation by a user onto the analog stick, and a first model adjustment value corresponding to a model of the game controller, and a first control circuit transmitting the correction parameter information to the main body apparatus. The main body apparatus has a second control circuit which selects any of the first manufacturing process correction parameter value and the first user correction parameter value and performs game processing based on the selected correction parameter value, the first model adjustment value, and input data from the analog stick.

12 Claims, 21 Drawing Sheets

(51) Int. Cl.
  *A63F 13/24*  (2014.01)
  *A63F 13/235*  (2014.01)
  *A63F 13/42*  (2014.01)
  A63F 13/92  (2014.01)
  A63F 13/95  (2014.01)

(52) U.S. Cl.
  CPC .............. *A63F 13/42* (2014.09); *A63F 13/92* (2014.09); *A63F 13/95* (2014.09)

(56) References Cited

U.S. PATENT DOCUMENTS

| | | |
|---|---|---|
| 2010/0182260 A1 | 7/2010 | Kiyuna |
| 2012/0202596 A1 | 8/2012 | Narita |
| 2015/0217190 A1 | 8/2015 | Coyne |
| 2015/0297992 A1 | 10/2015 | Ohta |
| 2017/0056768 A1* | 3/2017 | Aizawa ................ G06F 3/0338 |
| 2017/0252645 A1* | 9/2017 | McClive ................ A63F 13/22 |

* cited by examiner

FIG.10
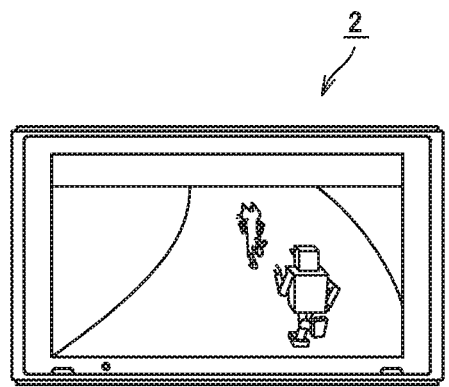
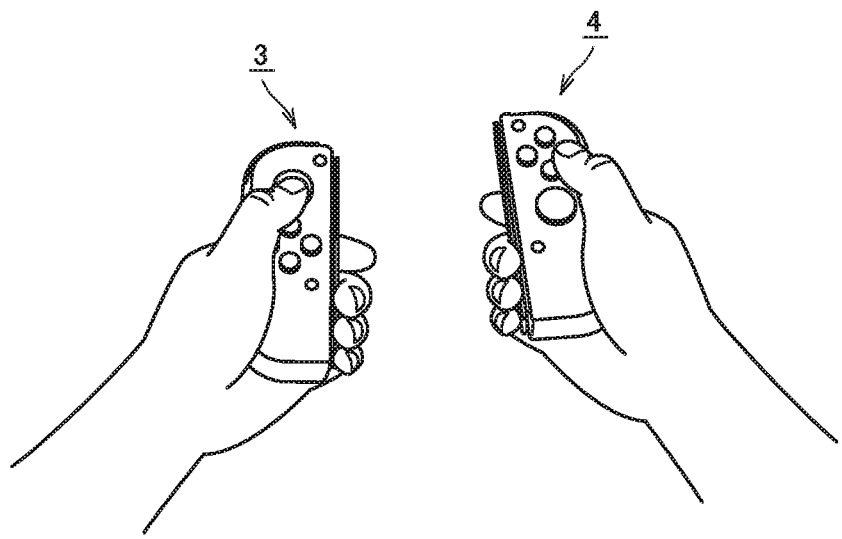

FIG.12

| | | | | |
|---|---|---|---|---|
| 301 | ACCELERATION SENSOR CORRECTION PARAMETER VALUE | MANUFACTURING PROCESS | REFERENCE VALUE DATA | 302 |
| | | USER | WRITE FLAG DATA | 304 |
| | | | REFERENCE VALUE DATA | 306 |
| 331 | ANGULAR SPEED SENSOR CORRECTION PARAMETER VALUE | MANUFACTURING PROCESS | REFERENCE VALUE DATA | 332 |
| | | USER | WRITE FLAG DATA | 334 |
| | | | REFERENCE VALUE DATA | 336 |
| 310 | ANALOG STICK CORRECTION PARAMETER VALUE | MANUFACTURING PROCESS | MAXIMUM STROKE VALUE | 311 |
| | | | ORIGIN | 312 |
| | | | MINIMUM STROKE VALUE | 313 |
| | | USER | WRITE FLAG DATA | 314 |
| | | | MAXIMUM STROKE VALUE | 315 |
| | | | ORIGIN | 316 |
| | | | MINIMUM STROKE VALUE | 317 |
| 320 | MODEL INFORMATION | | ACCELERATION SENSOR OFFSET VALUE | 321 |
| | | ANALOG STICK | CENTRAL DEAD BAND WIDTH | 322 |
| | | | OUTER DEAD BAND COEFFICIENT | 323 |
| | | | ENSURED STROKE RANGE | 324 |
| | | | ORIGIN RANGE | 325 |

300

GAME CONTROLLER CALIBRATION AND GAME SYSTEM USING GAME CONTROLLER

This nonprovisional application is based on Japanese Patent Application No. 2017-003397 filed with the Japan Patent Office on Jan. 12, 2017, the entire contents of which are hereby incorporated by reference.

FIELD

The present disclosure relates to processing in a game system and a game controller.

BACKGROUND AND SUMMARY

Calibration processing has conventionally and generally been performed in order to eliminate deviation from a reference value due to variation in physical characteristics and an individual difference of an apparatus component.

In this connection, a touch panel provided in a game device main body is calibrated. In such a game device, a value based on calibration processing is merely stored in the game device main body, and calibration processing corresponding to an individual controller is to be improved.

The present disclosure aims to solve the problem above, and an object thereof is to provide a game system and a game controller capable of performing highly accurate calibration processing for each controller.

A game system according to one aspect includes a main body apparatus and a game controller. The game controller includes an analog stick, a memory storing correction parameter information including a first manufacturing process correction parameter value determined in a manufacturing process in connection with the analog stick, a first user correction parameter value determined in accordance with an operation by a user onto the analog stick in connection with the analog stick, and a first model adjustment value corresponding to a model of the game controller in connection with the analog stick, and a first control circuit transmitting the correction parameter information stored in the memory to the main body apparatus. The main body apparatus has a second control circuit. The second control circuit selects any of the first manufacturing process correction parameter value and the first user correction parameter value included in the transmitted correction parameter information and performs game processing based on the selected correction parameter value, the first model adjustment value, and input data from the analog stick.

Correction parameter information for the analog stick is stored in the memory of the game controller. The correction parameter information for the analog stick is transmitted from the game controller to the main body apparatus and executed in game processing. Therefore, the main body apparatus can perform highly accurate calibration processing in accordance with the individual correction parameter information for the analog stick stored in the memory of the game controller.

In the exemplary embodiment, the second control circuit may preferentially select the first user correction parameter value when the correction parameter information includes the first user correction parameter value.

By preferentially selecting the first user correction parameter value, highly accurate calibration processing as intended by a user can be performed.

In the exemplary embodiment, the second control circuit may determine whether or not there is identification information indicating that the correction parameter information includes the first user correction parameter value and select the first user correction parameter value included in the correction parameter information when the second control circuit determines that there is identification information.

Since the first user correction parameter value can be selected based on whether or not there is identification information, processing in the second control circuit can be simplified and processing can be fast.

In the exemplary embodiment, the game controller may further have an acceleration sensor. The memory further stores a second manufacturing process correction parameter value determined in the manufacturing process in connection with the acceleration sensor and a second user correction parameter value determined in accordance with an operation by the user onto the game controller in connection with the acceleration sensor as a part of the correction parameter information. The second control circuit may select any of the second manufacturing process correction parameter value and the second user correction parameter value included in the transmitted correction parameter information. The second control circuit may perform the game processing also based on the selected correction parameter value and input data from the acceleration sensor.

Therefore, the main body apparatus can perform highly accurate calibration processing in accordance with the individual correction parameter information for the acceleration sensor stored in the memory of the game controller.

In the exemplary embodiment, the game controller may further have an angular speed sensor. The memory further stores a third manufacturing process correction parameter value determined in the manufacturing process in connection with the angular speed sensor and a third user correction parameter value determined in accordance with an operation by the user onto the game controller in connection with the angular speed sensor as a part of the correction parameter information. The second control circuit may select any of the third manufacturing process correction parameter value and the third user correction parameter value included in the transmitted correction parameter information. The second control circuit may perform the game processing also based on the selected correction parameter value and input data from the angular speed sensor.

Therefore, the main body apparatus can perform highly accurate calibration processing in accordance with the individual correction parameter information for the angular speed sensor stored in the memory of the game controller.

In the exemplary embodiment, the first model adjustment value may be information for setting a central dead band region and an outer dead band region.

The central dead band region and the outer dead band region corresponding to the model of the game controller can be set.

In the exemplary embodiment, the second control circuit may write the first user correction parameter value for the analog stick into the memory of the controller.

Since the first user correction parameter value is written in the memory of the controller, the main body apparatus does not have to hold such information and a memory in the main body apparatus can efficiently be used.

A game controller according to one aspect includes an analog stick, an acceleration sensor, a memory, and a communication control circuit provided to be able to communicate with a main body apparatus. The memory stores correction parameter information including a first manufacturing process correction parameter value determined in a manufacturing process in connection with the analog stick, a first user correction parameter value determined in accordance with an operation by a user onto the analog stick in connection with the analog stick, and a first model adjustment value corresponding to a model of the game controller in connection with the analog stick as well as a second manufacturing process correction parameter value determined in the manufacturing process in connection with the acceleration sensor, a second user correction parameter value determined in accordance with an operation by the user onto the game controller in connection with the acceleration sensor, and a second model adjustment value corresponding to the model of the game controller in connection with the acceleration sensor. The communication control circuit transmits the correction parameter information stored in the memory to the main body apparatus when the communication control circuit is connected to the main body apparatus, receives the first user correction parameter value or the second user correction parameter value to be stored in the memory from the main body apparatus, and transmits operation data from the analog stick and the acceleration sensor to the main body apparatus when the main body apparatus performs game processing.

The correction parameter information is stored in the memory of the game controller. The correction parameter information is transmitted from the game controller to the main body apparatus and executed in game processing. Therefore, the main body apparatus can perform highly accurate calibration processing in accordance with individual correction parameter information stored in the memory of the game controller.

In the exemplary embodiment, the first model adjustment value may include information for setting a central dead band region.

The central dead band region corresponding to the model of the game controller can be set.

In the exemplary embodiment, the first model adjustment value may include information for setting an outer dead band region.

The outer dead band region corresponding to the model of the game controller can be set.

In the exemplary embodiment, a plurality of analog sticks may be provided. The memory may store a plurality of first manufacturing process correction parameter values determined in the manufacturing process in connection with the plurality of analog sticks, respectively, a plurality of first user correction parameter values determined in accordance with operations by a user onto the plurality of analog sticks in connection with the plurality of analog sticks, respectively, and a plurality of first model adjustment values for the model of the game controller from the plurality of analog sticks in connection with the plurality of analog sticks, respectively.

When a plurality of analog sticks are provided as well, highly accurate calibration processing can be performed in accordance with the individual correction parameter information for the analog stick.

In the exemplary embodiment, the game controller may further have an angular speed sensor. The memory stores a third manufacturing process correction parameter value determined in the manufacturing process in connection with the angular speed sensor and a third user correction parameter value determined in accordance with an operation by the user onto the game controller in connection with the angular speed sensor as a part of the correction parameter information. The communication control circuit receives at least any of the first user correction parameter value, the second user correction parameter value, and the third user correction parameter value to be stored in the memory from the main body apparatus and transmits operation data from at least any of the analog stick, the acceleration sensor, and the angular speed sensor to the main body apparatus when the main body apparatus performs game processing.

The correction parameter information is stored in the memory of the game controller further having the angular speed sensor. The correction parameter information is transmitted from the game controller to the main body apparatus and executed in game processing. Therefore, the main body apparatus can perform highly accurate calibration processing in accordance with individual correction parameter information stored in the memory of the game controller.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 10 is an example non-limiting diagram showing one example of a manner of use of game device 1 with left controller 3 and right controller 4 being detached from main body apparatus 2.

FIG. 12 is an example non-limiting diagram illustrating correction parameter information stored in a memory of the controller based on the embodiment.

DETAILED DESCRIPTION OF NON-LIMITING EXAMPLE EMBODIMENTS

Figure 1:
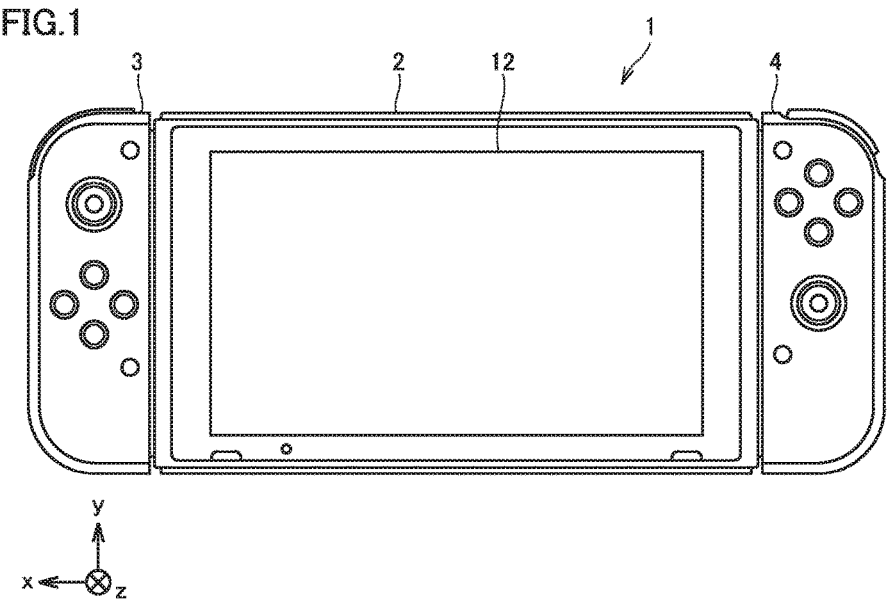
FIG. 1 is an example non-limiting schematic diagram showing appearance of a game device 1 according to the present embodiment.

This embodiment will be described in detail with reference to the drawings. The same or corresponding elements in the drawings have the same reference characters allotted and description thereof will not be repeated.

[A. Information Processing System]

An apparatus configuration relating to an information processing system based on the present embodiment will be described. The information processing system according to the present embodiment is configured at least with an information processing apparatus described below.

For example, an information processing apparatus may be a portable (also referred to as mobile) device such as a portable game device, a portable telephone, or a smartphone, a stationary apparatus such as a personal computer or a home game console, or a large apparatus such as an arcade game machine. In the present example, a game device representing one example of an information processing apparatus will be described by way of example. Though a game controller provided for a game device will be described in the present example by way of example of an operation apparatus, limitation in particular to a game controller is not intended and any operation apparatus may be applicable so long as it functions as an input device capable of transmitting operation data to an information processing apparatus.

(a1: Overall Configuration of Game Device)

FIG. 1 is an example non-limiting schematic diagram showing appearance of a game device 1 according to the present embodiment.

As shown in FIG. 1, game device 1 includes a main body apparatus 2, a left controller 3, and a right controller 4. Main body apparatus 2 includes a display 12 representing one example of a display portion and performs various types of processing including game processing in game device 1.

Figure 2:
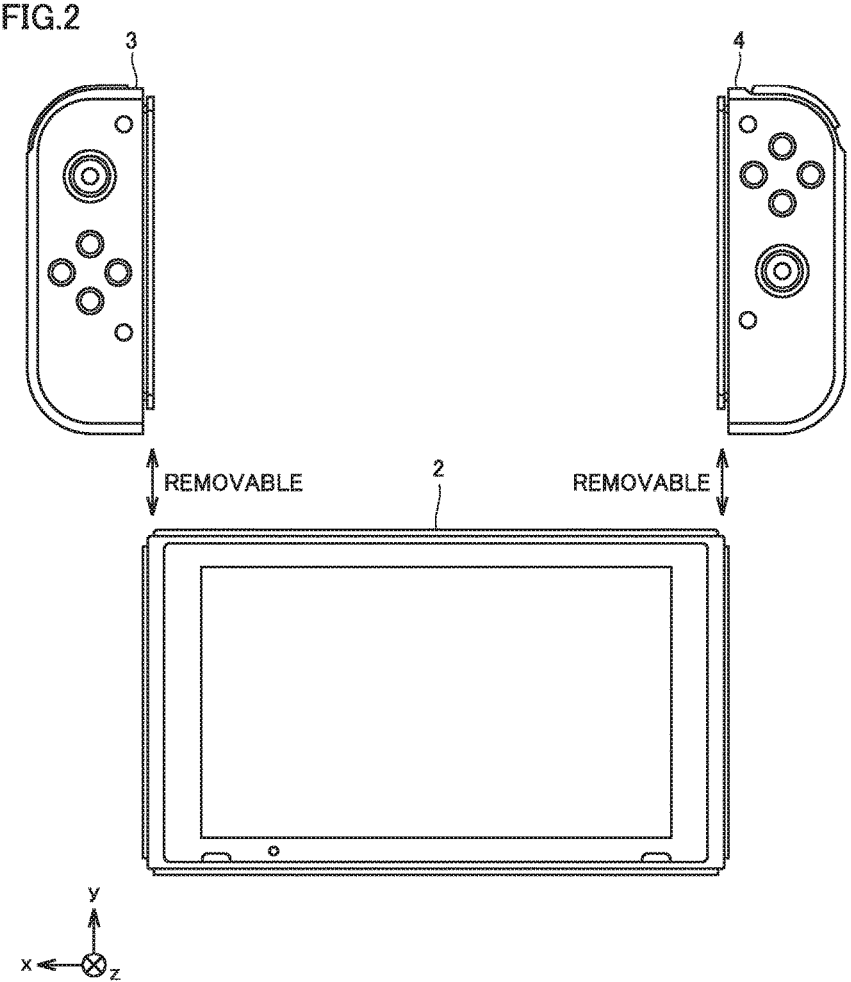
FIG. 2 is an example non-limiting schematic diagram showing appearance of another manner of game device 1 according to the present embodiment.

FIG. 2 is an example non-limiting schematic diagram showing appearance of another manner of game device 1 according to the present embodiment.

As shown in FIG. 2, left controller 3 and right controller 4 may be constructed as being detachable from main body apparatus 2. Left controller 3 and right controller 4 may integrally be constructed or left controller 3 and right controller 4 may be constructed as separate apparatuses. Thus, left controller 3 and right controller 4 corresponding to an operation portion may be constructed separately from main body apparatus 2.

Left controller 3 can be attached to a left side (a side of a positive direction of an x axis shown in FIG. 1) of main body apparatus 2. Right controller 4 can be attached to a right side (a side of a negative direction of the x axis shown in FIG. 1) of main body apparatus 2. In the description below, left controller 3 and right controller 4 may collectively be referred to as a "controller". A more specific configuration example of main body apparatus 2, left controller 3, and right controller 4 will be described below.

(a2: Structure of Main Body Apparatus)

Figure 3:
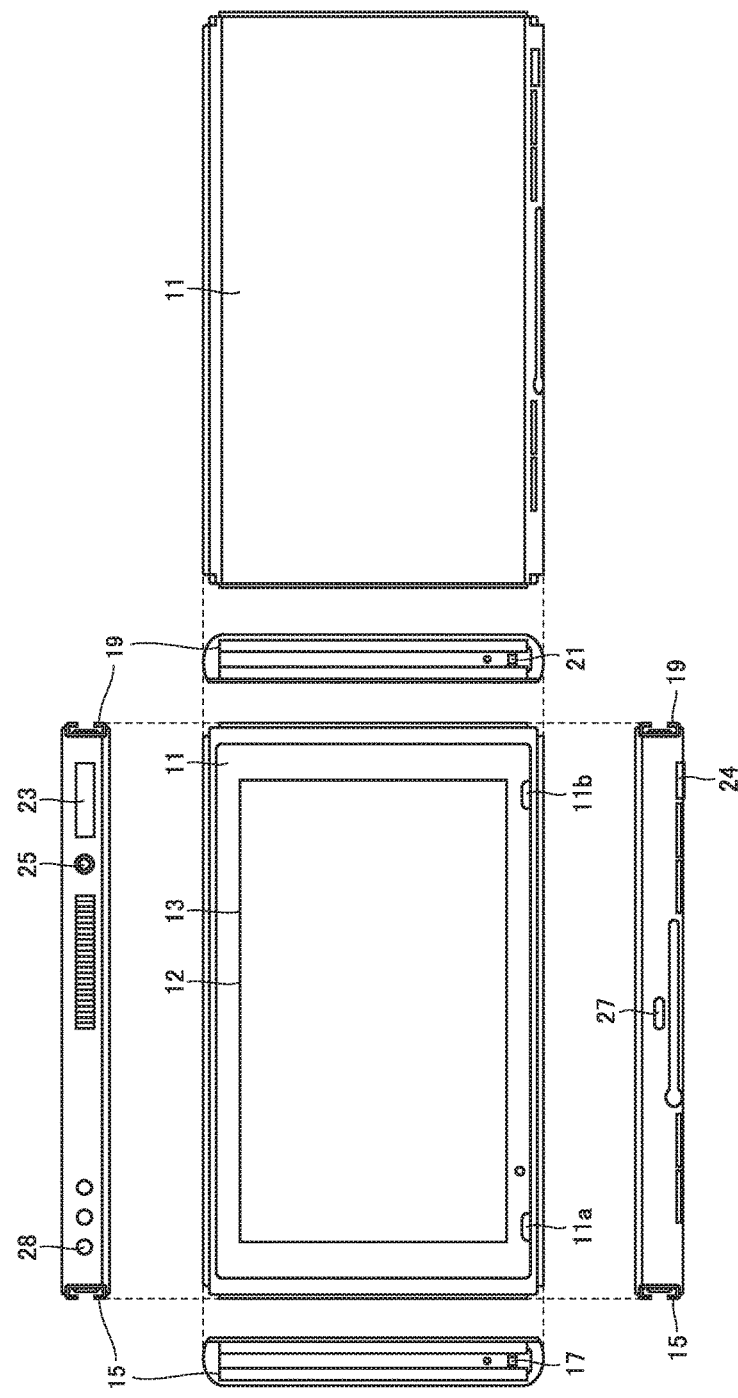
FIG. 3 is an example non-limiting diagram of a main body apparatus 2 according to the present embodiment when viewed from six sides.

FIG. 3 is an example non-limiting diagram of main body apparatus 2 according to the present embodiment when viewed from six sides.

Referring to FIG. 3, main body apparatus 2 has a housing 11 substantially in a form of a plate.

A main surface of housing 11 (that is, a front surface or a surface where display 12 is provided) is substantially in a rectangular shape. A shape and a size of housing 11 can arbitrarily be designed.

(1) Member Provided on Main Surface of Housing 11

As shown in FIGS. 1 to 3, display 12 is provided on the main surface of housing 11 of main body apparatus 2. Display 12 shows an image obtained or generated by main body apparatus 2 (which may be a still image or moving images). When game processing is performed, display 12 shows a virtual space and an object in the virtual space. Though display 12 is typically implemented by a liquid crystal display (LCD), a display apparatus of any type can be adopted.

A touch panel 13 is provided on a screen of display 12. Typically, a device of a type accepting a multi-touch input (for example, a capacitance type) is adopted as touch panel 13. For example, a device of any type such as a device of a type accepting a single-touch input (for example, a resistive film type) can be adopted as touch panel 13.

Speaker holes 11a and 11b are provided in the main surface of housing 11 of main body apparatus 2 and sound generated from a speaker (a speaker 88 shown in FIG. 7) arranged in housing 11 is output through speaker holes 11a and 11b.

Two speakers are provided in main body apparatus 2 and speaker holes 11a and 11b are provided in correspondence with respective positions of a left speaker and a right speaker. Speaker hole 11a is provided on a left side of display 12 in correspondence with the left speaker and speaker hole 11b is provided on a right side of display 12 in correspondence with the right speaker.

(2) Member Provided on Left Side Surface of Housing 11

A left rail member 15 for removably attaching left controller 3 to main body apparatus 2 is provided in a left side surface of housing 11. Left rail member 15 extends along an up-down direction in the left side surface of housing 11. Left rail member 15 is in a shape allowing engagement thereof with a slider (a slider 40 shown in FIG. 4) for left controller 3. A slide mechanism is formed by left rail member 15 and slider 40. With such a slide mechanism, left controller 3 can slidably and removably be attached to main body apparatus 2.

A left terminal 17 is provided in the left side surface of housing 11. Left terminal 17 is a terminal for wired communication between main body apparatus 2 and left controller 3. Left terminal 17 is provided at a position where it comes in contact with a terminal (a terminal 42 shown in FIG. 4) of left controller 3 when left controller 3 is attached to main body apparatus 2. Left terminal 17 should be arranged at any position where the left terminal of main body apparatus 2 and the terminal of left controller 3 are in contact with each other while left controller 3 is attached to main body apparatus 2. By way of example, as shown in FIG. 3, left terminal 17 is provided around a lower end portion of left rail member 15.

(3) Member Provided in Right Side Surface of Housing 11

As shown in FIG. 3, a feature similar to the feature provided in the left side surface is provided in a right side surface of housing 11. A right rail member 19 for removably attaching right controller 4 to main body apparatus 2 is provided in the right side surface of housing 11. Right rail member 19 extends along the up-down direction in the right side surface of housing 11. Right rail member 19 is in a shape allowing engagement thereof with a slider (a slider 62 shown in FIG. 5) for right controller 4. A slide mechanism is formed by right rail member 19 and slider 62. With such a slide mechanism, right controller 4 can slidably and removably be attached to main body apparatus 2.

Right rail member 19 is in a shape similar to left rail member 15. Right rail member 19 is in a grooved shape similar in cross-sectional shape to left rail member 15. Right rail member 19 does not have to be exactly the same in shape as left rail member 15. For example, another embodiment may be constructed such that slider 62 for right controller 4 cannot be engaged with left rail member 15 and/or slider 40 for left controller 3 cannot be engaged with right rail member 19 by making a size and/or a shape of the groove different between left rail member 15 and right rail member 19.

A right terminal 21 is provided in the right side surface of housing 11. Right terminal 21 is a terminal for wired communication between main body apparatus 2 and right controller 4. Right terminal 21 is provided at a position where it comes in contact with a terminal (a terminal 64 shown in FIG. 5) of right controller 4 when right controller 4 is attached to main body apparatus 2. Right terminal 21 should be arranged at any position where the right terminal of main body apparatus 2 and the terminal of right controller 4 are in contact with each other while right controller 4 is attached to main body apparatus 2. By way of example, as shown in FIG. 3, right terminal 21 is provided around a lower end portion of right rail member 19.

(4) Member Provided on Upper Side Surface of Housing 11

As shown in FIG. 3, a first slot 23 for attaching a storage medium of a first type is provided in an upper side surface of housing 11. A lid portion which can be opened and closed is provided in an opening in first slot 23 as a typical feature, and a storage medium of the first type can be inserted in first slot 23 while the lid portion is open. The storage medium of the first type is, for example, a storage medium exclusively designed for game device 1 and a game device of the same type (for example, a dedicated memory card). The storage medium of the first type is used, for example, for storing data used in main body apparatus 2 (for example, data saved for an application) and/or a program executed in main body apparatus 2 (for example, a program for an application).

A power button 28 for switching on and off main body apparatus 2 is provided on the upper side surface of housing 11.

An audio input and output terminal 25 (specifically an earphone jack) is provided in the upper side surface of housing 11. A microphone or an earphone can be attached to audio input and output terminal 25.

(5) Member Provided on Lower Side Surface of Housing 11

As shown in FIG. 3, a lower terminal 27 for wired communication between main body apparatus 2 and a cradle 5 which will be described later is provided in a lower side surface of housing 11. Lower terminal 27 is provided at a position where it comes in contact with a terminal of cradle 5 when main body apparatus 2 is attached to cradle 5. Typically, a universal serial bus (USB) connector (more specifically, a female connector) can be adopted as lower terminal 27.

A position, a shape, and the number of components (specifically, a button, a slot, and a terminal) provided in housing 11 described above can arbitrarily be designed. For example, in another embodiment, power button 28 or first slot 23 may be provided in another side surface or a rear surface of housing 11. Some of the components do not have to be provided.

(a3: Structure of Left Controller)

Figure 4:
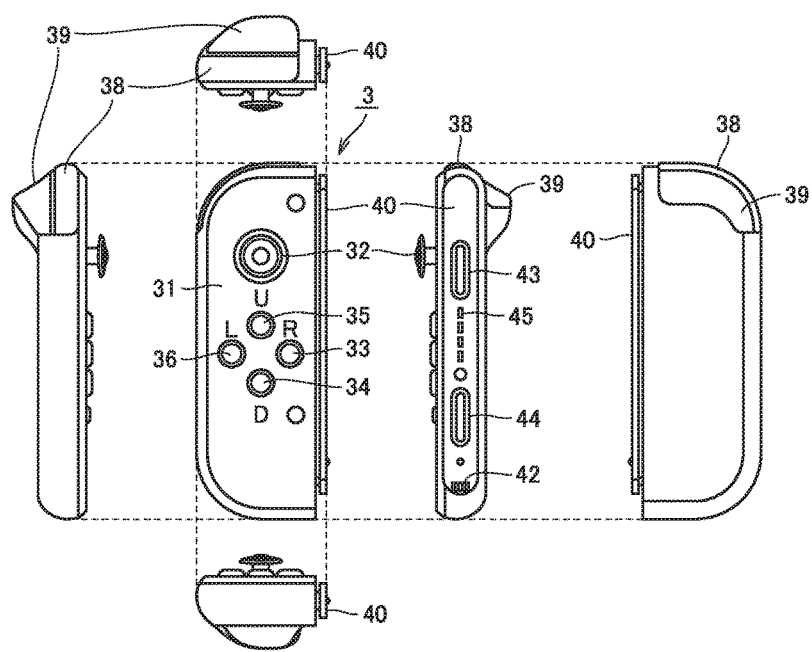
FIG. 4 is an example non-limiting diagram of a left controller 3 according to the present embodiment when viewed from six sides.

FIG. 4 is an example non-limiting diagram of left controller 3 according to the present embodiment when viewed from six sides.

Referring to FIG. 4, left controller 3 has a housing 31 substantially in a form of a plate. A main surface of housing 31 (that is, a front surface or a surface on a side of a negative direction of a z axis shown in FIG. 1) is substantially in a rectangular shape. Housing 31 is in a vertically long shape, that is, long in the up-down direction (that is, a direction of a y axis shown in FIG. 1).

Left controller 3 can be used with its main surface being vertically oriented or with its surface being horizontally oriented when a user holds the left controller while the left controller is detached from main body apparatus 2.

A shape and a size of housing 31 can arbitrarily be designed. In another embodiment, housing 31 may be constructed into a shape other than a shape substantially in a form of a plate. Housing 31 does not have to be rectangular, and for example, a semicircular shape may be adopted. Housing 31 does not have to vertically be long.

A length of housing 31 in the up-down direction is preferably substantially the same as a length in the up-down direction of housing 11 of main body apparatus 2. A thickness of housing 31 (that is, a length in a front-rear direction or a length in the direction of the z axis shown in FIG. 1) is preferably substantially the same as a thickness of housing 11 of main body apparatus 2. Therefore, when left controller 3 is attached to main body apparatus 2 (see FIG. 1), a user can hold main body apparatus 2 and left controller 3 as if they were an integrated apparatus.

A left corner portion of the main surface of housing 31 is rounded more than a right corner portion. A portion of connection between an upper side surface and a left side surface of housing 31 and a portion of connection between a lower side surface and the left side surface of housing 31 are rounded more than a portion of connection between the upper side surface and a right side surface and a portion of connection between the lower side surface and the right side surface (that is, a curve of beveling is great). Therefore, when left controller 3 is attached to main body apparatus 2 (see FIG. 1), the left side of game device 1 is rounded and hence such a shape facilitates holding by a user.

An analog stick 32 is provided in left controller 3. As shown in FIG. 4, analog stick 32 is provided on the main surface of housing 31. Analog stick 32 represents one example of a direction instruction portion with which a direction can be input. Analog stick 32 includes a stick member which can be tilted in all directions (that is, a 360° direction including up, down, left, right, and diagonal directions) in parallel to the main surface of housing 31. The analog stick is an analog input device with which a user can input a direction in accordance with a direction of tilt by titling the stick member. Analog stick 32 may further be constructed to be able to give an input of magnitude in accordance with an angle of tilt in addition to input of a direction in accordance with a direction of tilt when the stick member is tilted. Alternatively, a slide stick may implement the direction instruction portion. The slide stick is an input portion having a stick member slidable in all directions in parallel to the main surface of housing 31, and the user can give an input in accordance with a direction of slide by sliding the stick member. The slide stick may further be constructed also to give an input of magnitude in accordance with an amount of slide. Alternatively, the direction instruction portion may be implemented as an input portion indicating a direction through an operation to press a button. For example, the direction instruction portion may be implemented as an input portion indicating a direction with a cross-shaped key or four buttons corresponding to up, down, left, and right directions, respectively. In the present embodiment, an input can be given by pressing the stick member (in the direction perpendicular to housing 31). Analog stick 32 in the present embodiment is an input portion with which an input of a direction and magnitude in accordance with a direction of tilt and an amount of tilt of the stick member can be given and an input resulting from pressing of the stick member can be given.

Left controller 3 includes four operation buttons 33 to 36 (specifically, a right direction button 33, a down direction button 34, an up direction button 35, and a left direction button 36). As shown in FIG. 4, these four buttons 33 to 36 are provided under analog stick 32 on the main surface of housing 31. Though four operation buttons are provided on the main surface of left controller 3 in the present embodiment, any number of operation buttons may be provided. These operation buttons 33 to 36 are used for giving an instruction in accordance with various programs (for example, an OS program or an application program) executed in main body apparatus 2. Since operation buttons 33 to 36 may be used for giving an input of a direction in the present embodiment, operation buttons 33 to 36 are also referred to as right direction button 33, down direction button 34, up direction button 35, and left direction button 36 for the sake of convenience of description. Operation buttons 33 to 36 may be used for giving an instruction other than an input of a direction.

Figure 9:
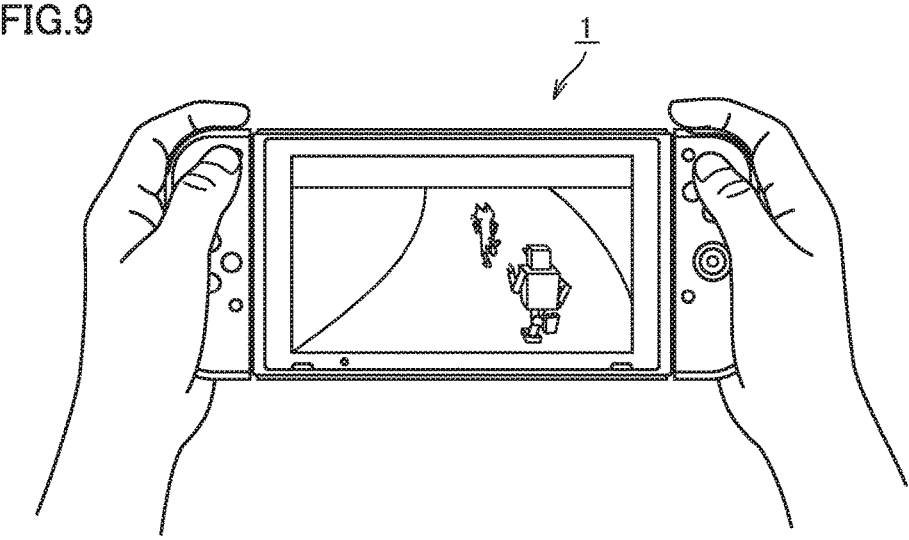
FIG. 9 is an example non-limiting diagram showing one example of a manner of use of game device 1 with left controller 3 and right controller 4 being attached to main body apparatus 2.

An operation portion (specifically, analog stick 32 and operation buttons 33 to 36) provided on the main surface of left controller 3 is operated, for example, with the left thumb of a user who holds game device 1 when left controller 3 is attached to main body apparatus 2 (see FIG. 9). When left controller 3 is used as being detached from main body apparatus 2, the operation portion is operated, for example, with the left thumb of the user who holds left controller 3 (see FIG. 10).

A first L button 38 and a ZL button 39 are provided in left controller 3. These operation buttons 38 and 39 are used for giving an instruction in accordance with various programs executed in main body apparatus 2, similarly to operation buttons 33 to 36 described above. As shown in FIG. 4, first L button 38 is provided in an upper left portion on the side surface of housing 31. ZL button 39 is provided in an upper left portion as extending from the side surface to the rear surface of housing 31 (strictly speaking, the upper left portion when housing 31 is viewed from the front). ZL button 39 is provided in the rear of first L button 38 (a side of a positive direction of the z axis shown in FIG. 1). Since the upper left portion of housing 31 is rounded in the present embodiment, first L button 38 and ZL button 39 are in a rounded shape in conformity with rounding of the upper left portion of housing 31.

When left controller 3 is attached to main body apparatus 2, first L button 38 and ZL button 39 are arranged in the upper left portion of game device 1 (see FIG. 1). Therefore, a user who holds game device 1 can operate first L button 38 and ZL button 39 with his/her left forefinger or long finger.

Left controller 3 has slider 40 described above. As shown in FIG. 4, slider 40 extends along the up-down direction in the right side surface of housing 31. Slider 40 is in a shape allowing engagement with left rail member 15 (more specifically, a groove in left rail member 15) of main body apparatus 2. Specifically, slider 40 has a projecting cross-section (specifically, a cross-section perpendicular to the up-down direction). More specifically, slider 40 has a cross-section in a T shape in conformity with a shape of a cross-section of left rail member 15. Therefore, slider 40 engaged with left rail member 15 is fixed and does not come off in a direction perpendicular to a direction of slide (that is, a direction of extension of left rail member 15).

Left controller 3 includes a second L button 43 and a second R button 44. These buttons 43 and 44 are used for giving an instruction in accordance with various programs executed in main body apparatus 2 similarly to other operation buttons 33 to 36. As shown in FIG. 4, second L button 43 and second R button 44 are provided in the surface where slider 40 is attached. Second L button 43 is provided above the center in terms of the up-down direction (the direction of they axis shown in FIG. 1) on the surface where slider 40 is attached. Second R button 44 is provided under the center in terms of the up-down direction on the surface where slider 40 is attached. Second L button 43 and second R button 44 are arranged at positions where they cannot be pressed while left controller 3 is attached to main body apparatus 2. Second L button 43 and second R button 44 are used while left controller 3 is detached from main body apparatus 2. Second L button 43 and second R button 44 are operated, for example, with a forefinger or a long finger of left and right hands of a user who holds left controller 3 detached from main body apparatus 2.

Left controller 3 includes a notification LED 45. Notification LED 45 is a notification unit for notifying a user of prescribed information. Information given by notification LED 45 is any information. In the present embodiment, when main body apparatus 2 communicates with a plurality of controllers, notification LED 45 indicates information for identifying each controller to a user. Specifically, left controller 3 includes as notification LED 45, LEDs as many as left controllers (four here) with which main body apparatus 2 can simultaneously communicate. An LED among four LEDs in accordance with a number provided to a controller is turned on. Thus, the user can be notified of the number through notification LED 45.

In another embodiment, notification LED 45 may notify the user of a state of communication between left controller 3 and main body apparatus 2. For example, notification LED 45 may be turned on when communication with main body apparatus 2 has been established. Though the number of LEDs (in other words, light emission portions) functioning as notification LED 45 is set to four in the present embodiment, the number of LEDs is set to any number.

In the present embodiment, notification LED 45 is provided on the surface where slider 40 is attached as shown in the figure. Therefore, notification LED 45 is arranged at a position hidden while left controller 3 is attached to main body apparatus 2. Notification LED 45 is used when left controller 3 is detached from main body apparatus 2.

In the present embodiment, a button (specifically, second L button 43 and second R button 44) provided on the surface where slider 40 is attached is provided not to protrude from that surface. An upper surface of the button (in other words, a surface which is pressed) is arranged flush with the surface where slider 40 is attached or at a position lower than such a surface. Thus, while slider 40 is attached to left rail member 15 of main body apparatus 2, slider 40 can smoothly be slid with respect to left rail member 15.

(a4: Structure of Right Controller)

Figure 5:
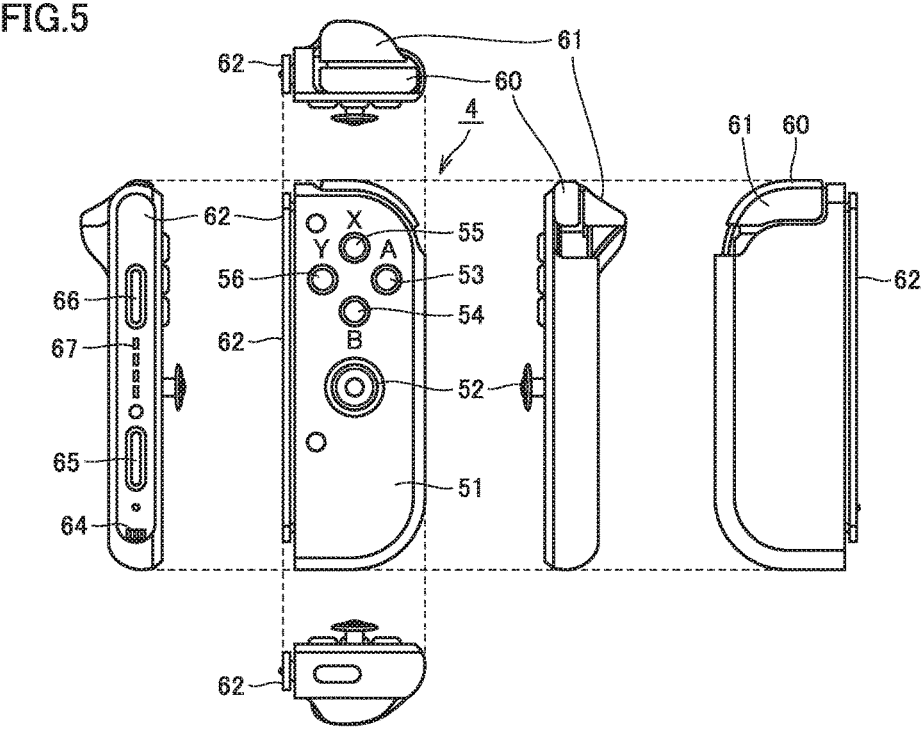
FIG. 5 is an example non-limiting diagram of a right controller 4 according to the present embodiment when viewed from six sides.

FIG. 5 is an example non-limiting diagram of right controller 4 according to the present embodiment when viewed from six sides.

Referring to FIG. 5, right controller 4 has a housing 51 substantially in a form of a plate. A main surface of housing 51 (that is, a front surface or a surface on the side of the negative direction of the z axis shown in FIG. 1) is substantially in a rectangular shape. Housing 51 is in a vertically long shape, that is, long in the up-down direction.

Right controller 4 can be used with its main surface being vertically oriented or with its surface being horizontally oriented when a user holds the right controller while the right controller is detached from main body apparatus 2.

Similarly to housing 31 of left controller 3, a length of housing 51 of right controller 4 in the up-down direction is preferably substantially the same as the length in the up-down direction of housing 11 of main body apparatus 2 and a thickness thereof is preferably substantially the same as the thickness of housing 11 of main body apparatus 2. Therefore, when right controller 4 is attached to main body apparatus 2 (see FIG. 1), a user can hold main body apparatus 2 and right controller 4 as if they were an integrated apparatus.

A right corner portion of the main surface of housing 51 is rounded more than a left corner portion. A portion of connection between an upper side surface and a right side surface of housing 51 and a portion of connection between a lower side surface and the right side surface of housing 51 are rounded more than a portion of connection between the upper side surface and a left side surface and a portion of connection between the lower side surface and the left side surface (that is, a curve of beveling is great). Therefore, when right controller 4 is attached to main body apparatus 2 (see FIG. 1), the right side of game device 1 is rounded and hence such a shape facilitates holding by a user.

An analog stick 52 is provided in right controller 4 as a direction instruction portion as in left controller 3. Analog stick 52 is constructed substantially similarly to analog stick 32 in left controller 3. Right controller 4 includes four operation buttons 53 to 56 (specifically, an A button 53, a B button 54, an X button 55, and a Y button 56) similarly to left controller 3. These four operation buttons 53 to 56 are substantially the same in mechanism as four operation buttons 33 to 36 in left controller 3. As shown in FIG. 5, analog stick 52 and operation buttons 53 to 56 are provided on the main surface of housing 51. Though four operation buttons are provided on the main surface of right controller 4 in the present embodiment, any number of operation buttons may be provided.

Positional relation between two types of operation portions (analog stick 52 and the operation buttons) in right controller 4 is opposite to positional relation of these two types of operation portions in left controller 3. In right controller 4, analog stick 52 is arranged under operation buttons 53 to 56, whereas in left controller 3, analog stick 32 is arranged above operation buttons 33 to 36. With such arrangement, when two controllers are used as being detached from main body apparatus 2, both of the controllers can be used with similar operational feeling.

When right controller 4 is attached to main body apparatus 2, the operation portion (specifically analog stick 52 and operation buttons 53 to 56) provided on the main surface of right controller 4 is operated, for example, with the right thumb of a user who holds game device 1. When right controller 4 is used as being detached from main body apparatus 2, the operation portion is operated, for example, with the right thumb of a user who holds right controller 4.

A first R button 60 and a ZR button 61 are provided in right controller 4. As shown in FIG. 5, first R button 60 is provided in an upper right portion on the side surface of housing 51. ZR button 61 is provided in an upper right portion as extending from the side surface to the rear surface of housing 51 (strictly speaking, the upper right portion when housing 51 is viewed from the front). ZR button 61 is provided in the rear of first R button 60 (the side of the positive direction of the z axis shown in FIG. 1). Since the upper right portion of housing 51 is rounded in the present embodiment, first R button 60 and ZR button 61 are in a rounded shape in conformity with rounding of the upper right portion of housing 51.

When right controller 4 is attached to main body apparatus 2, first R button 60 and ZR button 61 are arranged in the upper right portion of game device 1 (see FIG. 1). Therefore, a user who holds game device 1 can operate first R button 60 and ZR button 61 with his/her right forefinger or long finger.

In the present embodiment, first L button 38 and first R button 60 are not symmetric to each other in shape, and ZL button 39 and ZR button 61 are not symmetric to each other in shape. In another embodiment, first L button 38 and first R button 60 may be symmetric to each other in shape, and ZL button 39 and ZR button 61 may be symmetric to each other in shape.

Right controller 4 has terminal 64 for wired communication between right controller 4 and main body apparatus 2. Terminal 64 is provided at a position where it comes in contact with right terminal 21 (FIG. 3) of main body apparatus 2 when right controller 4 is attached to main body apparatus 2. Terminal 64 should be arranged at any position where main body apparatus 2 and right controller 4 are in contact with each other while right controller 4 is attached to main body apparatus 2. By way of example, as shown in FIG. 5, terminal 64 is provided around a lower end portion of a surface where slider 62 is attached.

A position, a shape, and the number of components (specifically, a slider, a stick, a button, and an LED) provided in housing 31 of left controller 3 and/or housing 51 of right controller 4 can arbitrarily be designed. For example, in another embodiment, the controller may include a direction instruction portion of a type different from the analog stick. Slider 40 or 62 may be arranged at a position in accordance with a position of left rail member 15 and right rail member 19 provided in main body apparatus 2, and for example, may be arranged in the main surface or the rear surface of housing 31 or 51. Some of the components do not have to be provided.

Right controller 4 includes a second L button 65 and a second R button 66 as in left controller 3. These buttons 65 and 66 are used for giving an instruction in accordance with various programs executed in main body apparatus 2 similarly to other operation buttons 53 to 56. As shown in FIG. 5, second L button 65 and second R button 66 are provided on the surface where slider 62 is attached. Second L button 65 is provided under the center in terms of the up-down direction (the direction of the y axis shown in FIG. 1) on the surface where slider 62 is attached. Second R button 66 is provided above the center in terms of the up-down direction on the surface where slider 62 is attached. Second L button 65 and second R button 66 are arranged at positions where they cannot be pressed while right controller 4 is attached to main body apparatus 2. Second L button 65 and second R button 66 are used while right controller 4 is detached from main body apparatus 2. Second L button 65 and second R button 66 are operated, for example, with a forefinger or a long finger of left and right hands of a user who holds right controller 4 detached from main body apparatus 2.

Right controller 4 includes a notification LED 67. Notification LED 67 is a notification unit for notifying a user of prescribed information similarly to notification LED 45 of left controller 3. Right controller 4 includes four LEDs as notification LEDs 67, as in left controller 3. An LED among four LEDs in accordance with a number provided to a controller is turned on. Thus, the user can be notified of the number through notification LED 67.

In the present embodiment, similarly to notification LED 45, notification LED 67 is provided on the surface where slider 62 is attached as shown in the figure. Therefore, notification LED 67 is arranged at a position hidden while right controller 4 is attached to main body apparatus 2. Notification LED 67 is used when right controller 4 is detached from main body apparatus 2.

In the present embodiment, also in right controller 4 as in left controller 3, a button (specifically, second L button 65 and second R button 66) provided on the surface where slider 62 is attached is provided not to protrude from that surface. An upper surface of the button (in other words, a surface which is pressed) is arranged flush with the surface where slider 62 is attached or at a position lower than such a surface. Thus, while slider 62 is attached to right rail member 19 of main body apparatus 2, slider 62 can smoothly be slid with respect to right rail member 19.

(a5: Use of Cradle)

Figure 6:
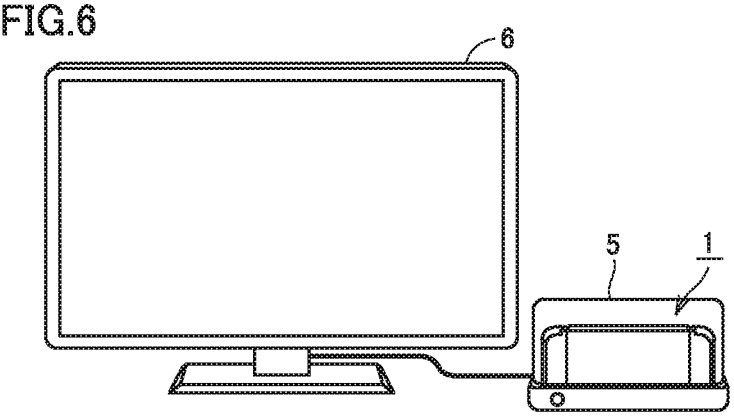
FIG. 6 is an example non-limiting schematic diagram showing appearance when game device 1 according to the present embodiment is used together with a cradle.

FIG. 6 is an example non-limiting schematic diagram showing appearance when game device 1 according to the present embodiment is used together with a cradle. A game system shown in FIG. 6 includes game device 1 and cradle 5.

Cradle 5 is constructed to be able to carry game device 1 and constructed to be able to communicate with a television 6 representing one example of an external display apparatus separate from display 12 of game device 1. When game device 1 is carried on cradle 5, an image obtained or generated by game device 1 can be shown on television 6. Communication between cradle 5 and television 6 may be wired communication or wireless communication.

Cradle 5 may have a function to charge placed game device 1 and a function as a communication hub apparatus (for example, a USB hub).

[B. Internal Configuration of Each Apparatus]

An internal configuration of each apparatus associated with the information processing system according to the present embodiment will initially be described.

(b1: Internal Configuration of Main Body Apparatus)

Figure 7:
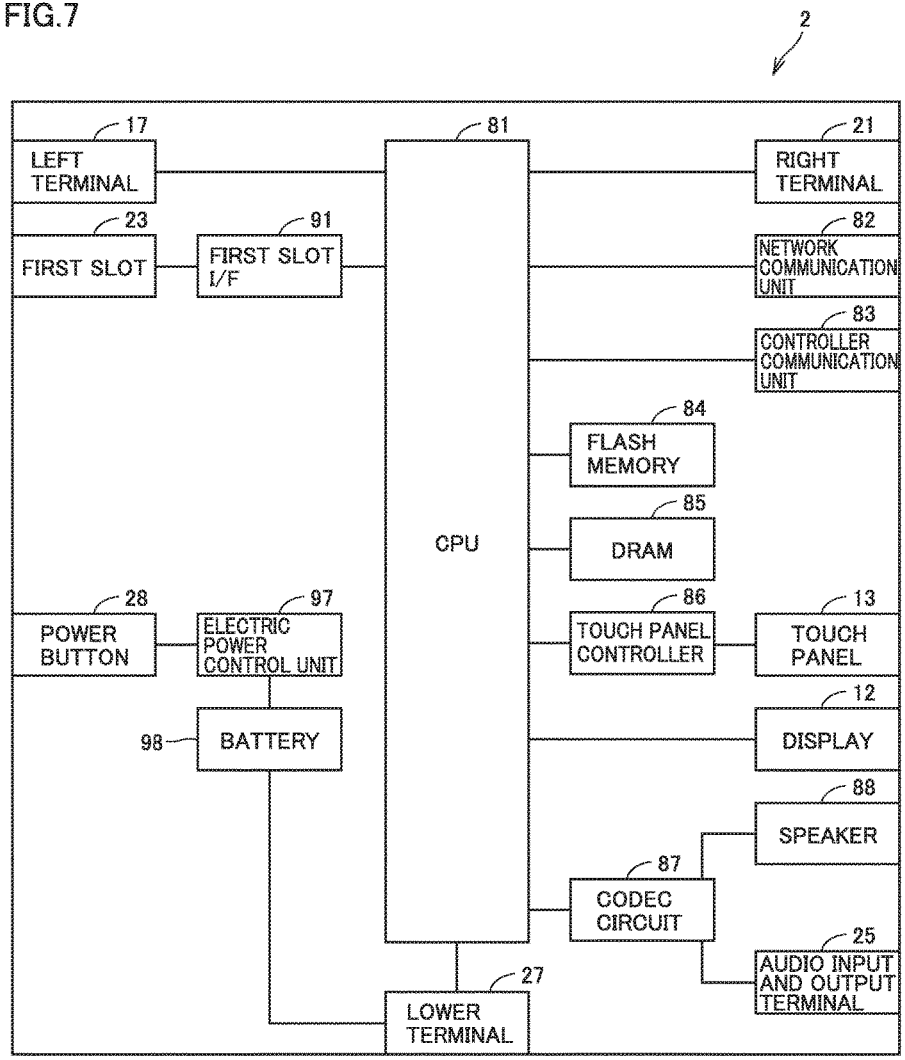
FIG. 7 is an example non-limiting block diagram showing an internal configuration of main body apparatus 2 according to the present embodiment.

FIG. 7 is an example non-limiting block diagram showing an internal configuration of main body apparatus 2 according to the present embodiment.

Main body apparatus 2 includes components shown in FIG. 7. The components shown in FIG. 7 are accommodated in housing 11, for example, as being mounted on an electronic circuit substrate as electronic components.

Main body apparatus 2 includes a central processing unit (CPU) 81 corresponding to an information processing unit (or a processor) performing various types of processing including game processing. CPU 81 reads and executes a program stored in an accessible storage unit (specifically, an internal storage medium such as a flash memory 84 or an external storage medium attached to first slot 23).

Main body apparatus 2 includes flash memory 84 and a dynamic random access memory (DRAM) 85 by way of example of an embedded internal storage medium. Flash memory 84 is a non-volatile memory mainly storing various types of data (which may be a program) saved in main body apparatus 2. DRAM 85 is a volatile memory temporarily storing various types of data used in information processing.

Main body apparatus 2 includes a first slot interface (I/F) 91. The first slot interface is connected to first slot 23 and reads and writes data from and into a storage medium of the first type (for example, an SD card) attached to first slot 23, in response to an instruction from CPU 81.

Main body apparatus 2 includes a network communication unit 82 for communication (specifically, wireless communication) with an external apparatus through a network. For example, a communication module authorized for Wi-Fi is employed for network communication unit 82 and network communication unit 82 communicates with an external apparatus through wireless LAN. In another embodiment, main body apparatus 2 may have a function for connection and communication with a mobile communication network (that is, a portable telephone communication network) in addition to (or instead of) a function for connection and communication with wireless LAN.

Main body apparatus 2 includes a controller communication unit 83 for wireless communication with left controller 3 and/or right controller 4. Though any scheme is applicable for communication between main body apparatus 2 and each controller, for example, a communication scheme under the Bluetooth™ specifications can be adopted.

CPU 81 is connected to left terminal 17, right terminal 21, and lower terminal 27. CPU 81 transmits and receives data to and from left controller 3 through left terminal 17 when wired communication with left controller 3 is established. CPU 81 transmits and receives data to and from right controller 4 through right terminal 21 when wired communication with right controller 4 is established. Data transmitted from CPU 81 to left controller 3 or right controller 4 is, for example, data for controlling a vibration generation portion of left controller 3 or right controller 4. Data received by CPU 81 from left controller 3 or right controller 4 is, for example, operation data output in response to an operation by a user of the operation portion in left controller 3 or right controller 4. CPU 81 transmits data to cradle 5 through lower terminal 27 when it communicates with cradle 5.

In the present embodiment, main body apparatus 2 can establish both of wired communication and wireless communication with left controller 3 and right controller 4.

Main body apparatus 2 includes a touch panel controller 86 for control of touch panel 13. Touch panel controller 86 generates data indicating a position of a touch input in response to a signal from touch panel 13, and outputs the data to CPU 81.

Display 12 shows an image generated by execution of various types of processing by CPU 81 and/or an image obtained from the outside.

Main body apparatus 2 includes a codec circuit 87 and speaker 88 (specifically, the left speaker and the right speaker). Codec circuit 87 controls input and output of audio data to and from speaker 88 and audio input and output terminal 25. More specifically, when codec circuit 87 receives audio data from CPU 81, it outputs an audio signal resulting from D/A conversion of the audio data to speaker 88 or audio input and output terminal 25. Thus, sound is output from speaker 88 or an audio output portion (for example, an earphone) connected to audio input and output terminal 25. When codec circuit 87 receives an audio signal from audio input and output terminal 25, it subjects the audio signal to A/D conversion and outputs audio data in a prescribed format to CPU 81.

Main body apparatus 2 includes an electric power control unit 97 and a battery 98. Electric power control unit 97 controls supply of electric power from battery 98 to each component based on a command from CPU 81. Electric power control unit 97 controls supply of electric power in accordance with an input onto power button 28. When an operation to turn off power supply is performed on power button 28, electric power control unit 97 stops supply of electric power totally or in part, and when an operation to turn on power supply is performed on power button 28, it starts full supply of electric power.

When an external charging apparatus (for example, cradle 5) is connected to lower terminal 27 and electric power is supplied to main body apparatus 2 through lower terminal 27, battery 98 is charged with supplied electric power.

(b2: Internal Configuration of Controller)

Figure 8:
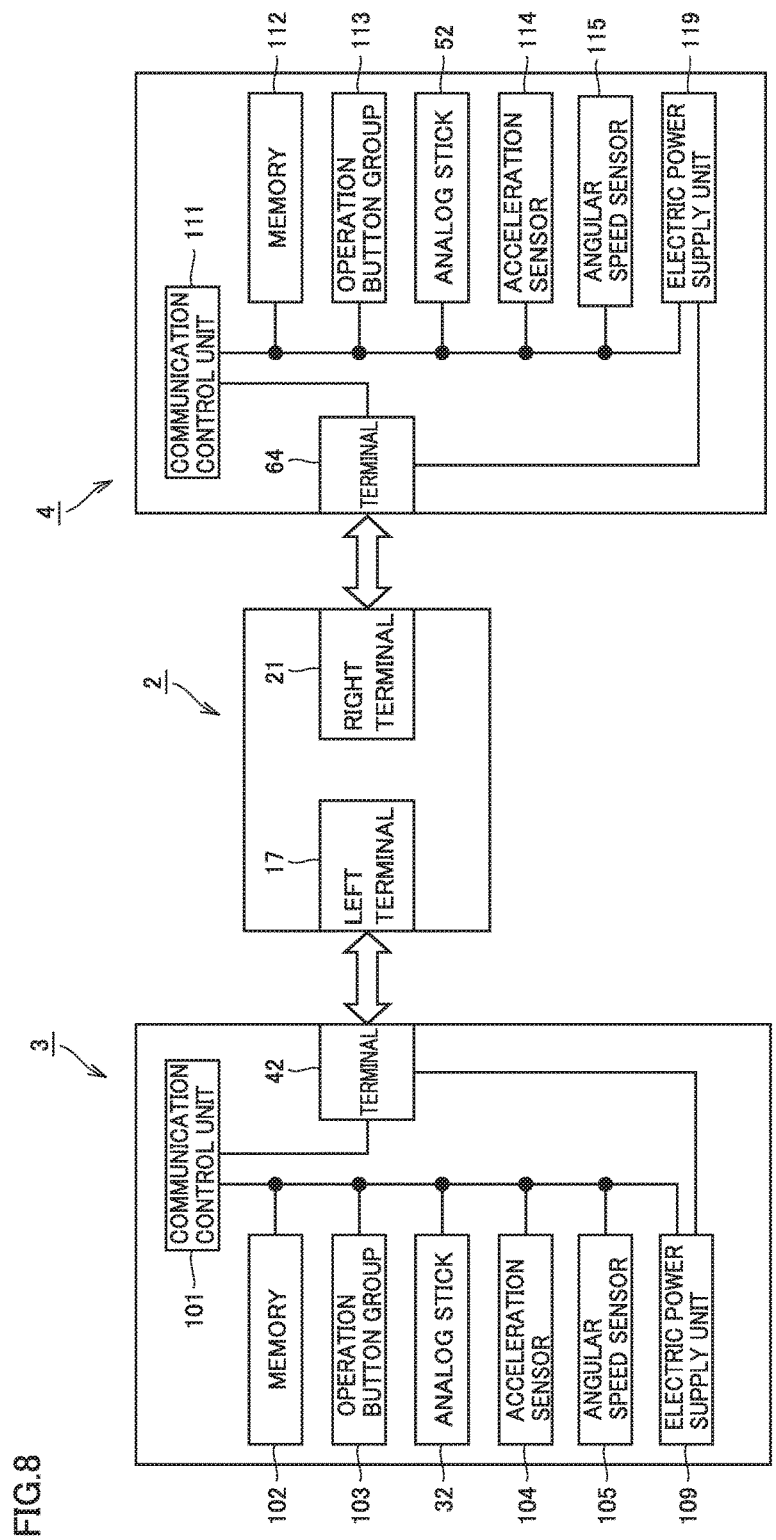
FIG. 8 is an example non-limiting block diagram showing an internal configuration of left controller 3 and right controller 4 according to the present embodiment.

FIG. 8 is an example non-limiting block diagram showing an internal configuration of left controller 3 and right controller 4 according to the present embodiment.

FIG. 8 also depicts components of main body apparatus 2 associated with left controller 3 and right controller 4.

Left controller 3 includes a communication control unit 101 for communication with main body apparatus 2. Communication control unit 101 can communicate with main body apparatus 2 through both of wired communication through terminal 42 and wireless communication not through terminal 42. Communication control unit 101 selects wired communication or wireless communication depending on whether or not left controller 3 is attached to main body apparatus 2, and establishes communication under a selected communication method. While left controller 3 is attached to main body apparatus 2, communication control unit 101 establishes communication with main body apparatus 2 through terminal 42. While left controller 3 is detached from main body apparatus 2, communication control unit 101 establishes wireless communication with main body apparatus 2 (specifically, controller communication unit 83). The communication control unit should only be able to establish communication with the main body apparatus, and for example, it may be configured to establish only either wired communication or wireless communication. While left controller 3 is detached from main body apparatus 2, wireless communication is established by way of example, however, wired communication may be established, for example, through a cable.

Left controller 3 includes, for example, a memory 102 such as a flash memory. Communication control unit 101 is implemented, for example, by a microprocessor and performs various types of processing by executing firmware stored in memory 102.

Left controller 3 includes an operation button group 103 (specifically operation buttons 33 to 36, 38, and 39) and analog stick 32. Information on an operation onto operation button group 103 and analog stick 32 is repeatedly output to communication control unit 101 with a prescribed period.

Left controller 3 has an acceleration sensor 104 and an angular speed sensor 105. Acceleration sensor 104 detects magnitude of a linear acceleration along directions of prescribed three axes (for example, the xyz axes shown in FIG. 1). Acceleration sensor 104 may detect an acceleration in a direction of one axis or accelerations in directions of two axes. Angular speed sensor 105 detects angular speeds around prescribed three axes (for example, the xyz axes shown in FIG. 1). Angular speed sensor 105 may detect an angular speed around one axis or angular speeds around two axes. A result of detection by acceleration sensor 104 and angular speed sensor 105 is repeatedly output to communication control unit 101 with a prescribed period.

Communication control unit 101 obtains information on an input from each of operation button group 103, analog stick 32, acceleration sensor 104, and angular speed sensor 105 (for example, information on an operation by a user or a result of detection by the sensor). Communication control unit 101 transmits data including obtained information (or information obtained by subjecting obtained information to prescribed processing) to main body apparatus 2. Data is transmitted to main body apparatus 2 repeatedly with a prescribed period. A period of transmission of information on an input to main body apparatus 2 may or may not be identical among input devices.

Main body apparatus 2 can know an input given to left controller 3 based on transmitted data. More specifically, main body apparatus 2 can discriminate an operation onto operation button group 103 and analog stick 32. Main body apparatus 2 can calculate information on a motion and/or an attitude of left controller 3.

Left controller 3 has an electric power supply unit 109 including a battery and an electric power control circuit. Electric power supply unit 109 controls power supply to each component of left controller 3. When left controller 3 is attached to main body apparatus 2, the battery is charged by power feed from main body apparatus 2 through terminal 42.

Electric power supply unit 109 gives battery warning information to main body apparatus 2 when the battery runs out of electric power.

Right controller 4 is configured basically similarly to left controller 3 described above. Right controller 4 includes a communication control unit 111, an operation button group 113 (specifically operation buttons 53 to 56, 60, and 61), analog stick 52, an acceleration sensor 114, an angular speed sensor 115, and an electric power supply unit 119. When the battery runs out of electric power, electric power supply unit 119 gives battery warning information to main body apparatus 2.

Since other components of right controller 4 have features and functions the same as those of corresponding components described in connection with left controller 3, detailed description will not be repeated.

Thus, game device 1 according to the present embodiment includes left controller 3 held in the left hand of the user (one hand) (a portion held in the left hand of the user) and right controller 4 held in the right hand (the other hand) of the user (a portion held in the right hand of the user).

The "operation portion" herein may mean a function or a feature accepting an operation by a user and encompass any component such as a button, an analog stick, and various sensors arranged in main body apparatus 2, left controller 3, and right controller 4, so long as it can sense an operation performed by a user. The operation portion may be configured to be able to sense an operation by the user based on combination of a button, an analog stick, and various sensors as being distributed in main body apparatus 2, left controller 3, and right controller 4.

[C. Manner of Use of Game System]

As described above, game device 1 according to the present embodiment is constructed such that left controller 3 and right controller 4 are removable. Game device 1 can output an image and sound to television 6 by being attached to cradle 5. Therefore, game device 1 can be used in various manners of use as will be described below. A main manner of use of game device 1 will be exemplified below.

(c1: Manner of Use with Controller being Attached to Main Body Apparatus)

FIG. 9 is an example non-limiting diagram showing one example of a manner of use of game device 1 with left controller 3 and right controller 4 being attached to main body apparatus 2 (hereinafter also referred to as an "attached state").

As shown in FIG. 9, in the attached state, game device 1 can be used as a portable device.

In the attached state, basically, communication between main body apparatus 2, and left controller 3 and right controller 4 is established through wired communication. In another embodiment, communication between main body apparatus 2, and left controller 3 and right controller 4 may be established through wireless communication also in the attached state.

In the attached state, four operation buttons 33 to 36 of left controller 3 may be used for inputting a direction (that is, an instruction for a direction). A user can input a direction with analog stick 32 or operation buttons 33 to 36. Since the user can input a direction with his/her preferred operation means, operability can be improved. For which instruction operation buttons 33 to 36 are used may arbitrarily be determined depending on a program executed in main body apparatus 2.

In the present embodiment, arrangement of the analog stick and four operation buttons (that is, A, B, X, and Y buttons) is reverse between left controller 3 and right controller 4. In the attached state, analog stick 32 is arranged above four operation buttons 33 to 36 in left controller 3, whereas four operation buttons 53 to 56 are arranged above analog stick 52 in right controller 4. Therefore, when a user holds game device 1 with his/her both hands being located at the same height (that is, at positions the same in the up-down direction) as shown in FIG. 9, the analog stick is located at a position readily operable with one hand and the four operation buttons are located at positions readily operable with the other hand. Game device 1 according to the present embodiment thus provides a feature facilitating an operation of the analog stick and four operation buttons.

(c2: Manner of Use with One Set of Controllers being Detached from Main Body Apparatus)

FIG. 10 is an example non-limiting diagram showing one example of a manner of use of game device 1 with left controller 3 and right controller 4 being detached from main body apparatus 2 (hereinafter also referred to as a "detached state").

As shown in FIG. 10, in the detached state, the user can operate left controller 3 and right controller 4 in his/her left and right hands, respectively.

In this case, analog stick 32 and four operation buttons 33 to 36 of left controller 3 are operated as being arranged vertically in the left hand in which the controller is held.

Similarly, analog stick 52 and four operation buttons 53 to 56 of right controller 4 are operated as being arranged vertically in the right hand in which the controller is held.

The controller is used such that the main surface thereof is vertically oriented when the user holds the controller (also referred to as an operation in vertical holding).

In the detached state, basically, communication between main body apparatus 2, and left controller 3 and right controller 4 is established through wireless communication. Main body apparatus 2 receives data from the controller with which it has established wireless communication (pairing has been done) and performs game processing based on the received data.

In the present embodiment, in wireless communication, main body apparatus 2 distinguishes between left controller 3 and right controller 4 which are communication counterparts. Main body apparatus 2 identifies whether the data received from the controller is from left controller 3 or from right controller 4.

Though FIG. 10 shows a manner of use by one user of one set of controllers (the left controller and the right controller), such a manner of use that two users use the respective controllers is also applicable. In this case, two users can simultaneously participate in a game with one set of controllers (the left controller and the right controller).

Though FIG. 10 shows a state that both of left controller 3 and right controller 4 are detached from main body apparatus 2, limitation thereto is not intended and game device 1 can be used with any one of left controller 3 and right controller 4 being detached from main body apparatus 2 and the other being attached to main body apparatus 2.

[D. Accessory Controller]

An accessory controller 401 will now be described.

Separately from left controller 3 and right controller 4, accessory controller 401 which can communicate with main body apparatus 2 of game device 1 can also be provided.

Figure 11:
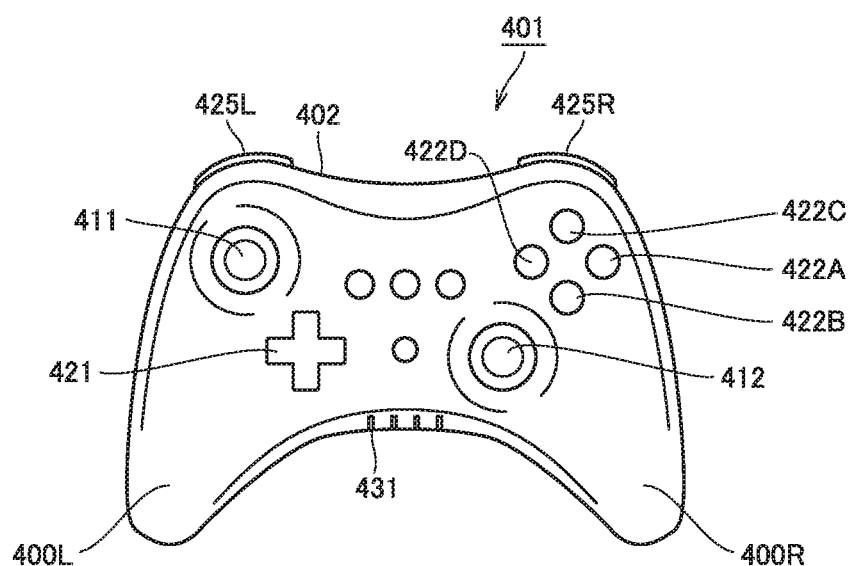
FIG. 11 is an example non-limiting diagram showing appearance of an accessory controller 401 based on an embodiment.

FIG. 11 is an example non-limiting diagram showing appearance of accessory controller 401 based on an embodiment.

As shown in FIG. 11, accessory controller 401 is mainly constituted of a housing 402 including grip portions 400L and 400R on the left and right (which may hereinafter collectively also be called a grip portion 400) and an operation portion including two analog sticks protruding through openings provided in a surface of housing 402 and a plurality of operation buttons (which will be described later).

Housing 402 is substantially in a smooth trapezoidal shape with a longitudinal direction thereof being defined as a lateral direction when viewed from the front. The housing may be in such a shape that an upper side is slightly recessed and a lower side is more recessed than the upper side, in other words, grip portions 400L and 400R extend toward a bottom surface (forward when viewed from a player while the controller is held). A front surface side may be constructed substantially planar except for a position where the analog stick is provided.

A position where the analog stick is located is slightly raised and grip portions 400L and 400R may be in a shape gently curved rearward from the front. Housing 402 in the present example may be formed, for example, through plastic molding.

A first analog stick 411 (hereinafter a left stick) is provided around an upper surface side at a left end on a front surface of housing 402 and a second analog stick 412 (hereinafter a right stick) is provided around a lower surface side at a right end on the front surface of housing 402. More specifically, left stick 411 is arranged at a position operable with the thumb of the left hand with which grip portion 400L is held (more suitably, a position where the thumb of the left hand with which grip portion 400L is held is naturally located), and right stick 412 is arranged at a position operable with the thumb of the right hand with which grip portion 400R is held. Left stick 411 and right stick 412 are sticks which can be tilted in any direction around 360 degrees and used for indicating any direction.

Left stick 411 and right stick 412 can be pressed rearward and also play a role as a push button. Left stick 411 and right stick 412 function in accordance with a program executed by main body apparatus 2 to which the controller is connected.

Since a distance between left stick 411 and right stick 412 is thus great, a distance between the thumbs is not small even in an operation to tilt both of them inward and hence operability is good.

A cross-shaped key (which may also be called a direction key) 421 is provided at a position on the left of a substantially central position on the front surface of housing 402 and on an inner side of left stick 411, where the cross-shaped key is operable with the thumb of the left hand with which grip portion 400L is held. More specifically, cross-shaped key 421 is provided at a position on the lower right of left stick 411. Cross-shaped key 421 is such a four-directional cross-shaped push switch that operation portions corresponding to four respective directions (front, rear, left, and right) are arranged at an interval of 90° on respective projecting parts of the cross. As a player presses any operation portion of cross-shaped key 421, any of the front, rear, left, and right directions is selected. Cross-shaped key 421 functions in accordance with a program executed by main body apparatus 2 to which the controller is connected.

Cross-shaped key 421 is not limited to the shape as illustrated and any shape is applicable so long as a shape allows input of four directions. For example, such a shape that a cross-shaped raised portion is provided in a circular base is acceptable and four separate keys may be acceptable.

Operation buttons 422A to 422D (which may hereinafter also be called a first operation button group) are arranged at upper, lower, left, and right positions of a cross pattern on the right of substantially the center on the front surface of housing 402 in an area above right stick 412, where the buttons are operable with the thumb of the right hand with which grip portion 400R is held. More specifically, operation buttons 422A to 422D are arranged at upper, lower, left, and right positions of the cross-pattern in an area located on the upper right of right stick 412. For example, operation buttons 422A to 422D are used for indicating enter or cancel.

By arranging cross-shaped key 421 at a position on the lower right of left stick 411, the thumb pad can be moved to the position of cross-shaped key 421 by moving the thumb with the root of the left thumb being set as the fulcrum. In other words, the thumb pad can be moved to the position of cross-shaped key 421 simply by moving the thumb to the right with the root of the thumb being set as the fulcrum without particularly changing an attitude to hold grip portion 400L and the thumb can also be returned to the position of left stick 411 by moving the thumb to the left. Skip between left stick 411 and cross-shaped key 421 is facilitated and operability can be improved. In other words, there is no lowering in operability caused by the stick constituting the obstacle as being located between the tip end of the thumb (the position of the cross-shaped key) and the root of the thumb in operation of cross-shaped key 421.

Similarly, by arranging right stick 412 at the position on the lower left of the first operation button group (operation buttons 422A to 422D), the thumb can be moved between right stick 412 and the first operation button group simply by moving the thumb with the root of the right thumb being set as the fulcrum. Skip between right stick 412 and the first operation button group is thus facilitated and operability can be improved.

An L button 425L is provided on a front side in a left end portion of the upper surface of housing 402 and a ZL button is provided under the same (on a rear side). An R button 425R is arranged on the front side in a right end portion of the upper surface of housing 402 and a ZR button is arranged under the same (on the rear side). L button 425L is arranged at a position where the L button can be reached by the forefinger of the left hand with which grip portion 400L is held and the ZL button is arranged at a position where the ZL button can be reached by the left long finger or ring finger. R button 425R is arranged at a position where the R button can be reached by the forefinger of the right hand with which grip portion 400R is held and the ZR button is arranged at a position where the ZR button can be reached by the right long finger or ring finger. Functions in accordance with a program executed by the information processing apparatus are allocated as appropriate to L button 425L, R button 425R, the ZL button, and the ZR button.

Operation buttons similar to the operation buttons provided in left controller 3 and right controller 4 described above are also provided in accessory controller 401.

A plurality of indicators are provided on a bottom surface side of the front surface of housing 402. Specifically, a notification LED 431 is provided. Notification LED 431 serves as a notification unit for notifying a user of prescribed information, similarly to the notification LED of the left controller. Notification LED 431 includes four LEDs. Among the four LEDs, an LED in accordance with a player number allocated to a controller is turned on. Thus, the user can be notified of the player number by notification LED 431.

Since accessory controller 401 is basically similar in internal configuration to left controller 3 or right controller 4 described with reference to FIG. 8, detailed description thereof will not be repeated.

Identification information represented by a value (for example, an ID) specifically provided to accessory controller 401 is stored in a memory of accessory controller 401. Main body apparatus 2 can identify a controller as the accessory controller, not as left controller 3 or right controller 4, based on the identification information.

[E: Correction Parameter]

FIG. 12 is an example non-limiting diagram illustrating correction parameter information stored in the memory of the controller based on the embodiment.

By way of example, correction parameter information stored in memory 102 of controller 3 will be described. The description is also applicable to memory 112 of controller 4.

Correction parameter information stored in memory 102 is used for processing for correcting operation data of the analog stick, the acceleration sensor, and the angular speed sensor input from the controller (calibration processing).

As shown in FIG. 12, correction parameter information includes an acceleration sensor correction parameter value 301 used for processing for correcting operation data of the acceleration sensor (calibration processing), an angular speed sensor correction parameter value 331 used for processing for correcting operation data of the angular speed sensor (calibration processing), an analog stick correction parameter value 310 used for processing for correcting operation data of the analog stick (calibration processing), and model information 320 relating to an adjustment parameter (an adjustment value) for each model (type) of the controller.

Acceleration sensor correction parameter value 301 includes reference value data 302 as of a manufacturing process and write flag data 304 and reference value data 306 in accordance with correction parameter setting processing.

Angular speed sensor correction parameter value 331 includes reference value data 332 as of the manufacturing process and write flag data 334 and reference value data 336 in accordance with correction parameter setting processing.

Analog stick correction parameter value 310 includes a maximum stroke value 311, an origin 312, and a minimum stroke value 313 as of the manufacturing process as well as write flag data 314, a maximum stroke value 315, an origin 316, and a minimum stroke value 317 in accordance with correction parameter setting processing.

Model information 320 includes an acceleration sensor offset value 321 as well as a central dead band width 322, an outer dead band coefficient 323, an ensured stroke range 324, and an origin range 325 for the analog stick. Though data relating to the angular speed sensor is not included in the model information in the present example by way of example, it may be included.

When correction parameter setting processing is performed, a write flag (identification information) is stored in write flag data 304, 314, and 334. Whether or not data based on execution of the correction parameter setting processing is stored can be determined based on the write flag (identification information) stored in write flag data 304, 314, and 334.

In the present example, memory 102 stores in advance data as of the manufacturing process (a manufacturing process correction parameter).

Data as of the manufacturing process refers to data determined in the process for manufacturing controller 3 and stored in memory 102, and memory 102 storing the data may be mounted on controller 3 or the data may be stored after memory 102 is mounted on controller 3.

Data in accordance with the correction parameter setting processing (user correction parameter data) is selective, and it is stored when a user selects correction parameter setting processing in a correction parameter setting screen which will be described later.

When data in accordance with the correction parameter setting processing is stored in memory 102, the data is used in preference to data as of the manufacturing process.

Therefore, in an initial state, data as of the manufacturing process is used for processing for correcting operation data (calibration processing). When the correction parameter setting processing is performed, data obtained through the correction parameter setting processing is used for processing for correcting operation data (calibration processing).

The correction parameter information is read from memory 102 and transmitted to main body apparatus 2 when controller 3 is connected to main body apparatus 2. CPU 81 of main body apparatus 2 has DRAM 85 store the received correction parameter information and uses the information in correction parameter setting processing and game execution processing.

Figure 13:
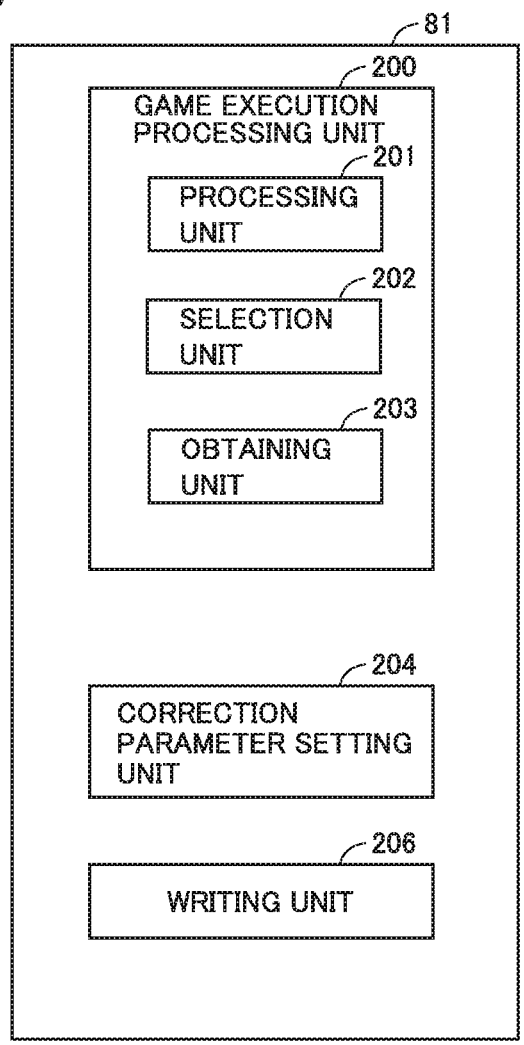
FIG. 13 is an example non-limiting diagram illustrating a functional block configuration of main body apparatus 2 based on the embodiment.

FIG. 13 is an example non-limiting diagram illustrating a functional block configuration of main body apparatus 2 based on the embodiment.

Referring to FIG. 13, a game execution processing unit 200, a correction parameter setting unit 204, and a writing unit 206 are implemented by execution of a program by CPU 81 of main body apparatus 2.

Game execution processing unit 200 controls game processing. Game execution processing unit 200 successively updates contents of representation on display 12 in accordance with contents of operation data resulting from an operation by a user and input from the controller.

Game execution processing unit 200 includes a processing unit 201, a selection unit 202, and an obtaining unit 203.

Processing unit 201 controls overall game processing and performs various types of processing.

Obtaining unit 203 obtains correction parameter information stored in the controller.

Selection unit 202 selects a correction parameter value to be used for processing for correcting operation data (calibration processing) in the obtained correction parameter information and outputs the correction parameter value to processing unit 201. Specifically, when data in accordance with the correction parameter setting processing is included in the correction parameter information, selection unit 202 selects data in accordance with the correction parameter setting processing. When the data is not included, data registered in advance during the manufacturing process is selected.

By way of example, selection unit 202 determines whether or not there is a write flag in write flag data 304 in acceleration sensor correction parameter value 301 in the correction parameter information, and when it determines that there is a write flag, it selects reference value data 306 in accordance with the correction parameter setting processing and outputs the reference value data to processing unit 201. When the selection unit determines that there is no write flag, it outputs reference value data 302 as of the manufacturing process to processing unit 201.

Selection unit 202 determines whether or not there is a write flag in write flag data 334 in angular speed sensor correction parameter value 331 in the correction parameter information, and when it determines that there is a write flag, it selects reference value data 336 in accordance with the correction parameter setting processing and outputs the reference value data to processing unit 201. When the selection unit determines that there is no write flag, it outputs reference value data 332 as of the manufacturing process to processing unit 201.

Similarly, selection unit 202 determines whether or not there is a write flag in write flag data 314 in analog stick correction parameter value 310 in the correction parameter information, and when it determines that there is a write flag, it outputs maximum stroke value 315, origin 316, and minimum stroke value 317 in accordance with the correction parameter setting processing to processing unit 201. When the selection unit determines that there is no write flag, it outputs maximum stroke value 311, origin 312, and minimum stroke value 313 as of the manufacturing process to processing unit 201.

Selection unit 202 outputs model information 320 in the correction parameter information to processing unit 201.

Correction parameter setting unit 204 performs correction parameter setting processing in response to an operation by a user.

Writing unit 206 outputs data resulting from correction parameter setting processing by correction parameter setting processing 204 to controller 3 together with a write order to have the data stored in memory 102 of controller 3. Controller 3 receives the write order from writing unit 206 and has memory 102 store the data.

Figure 14:
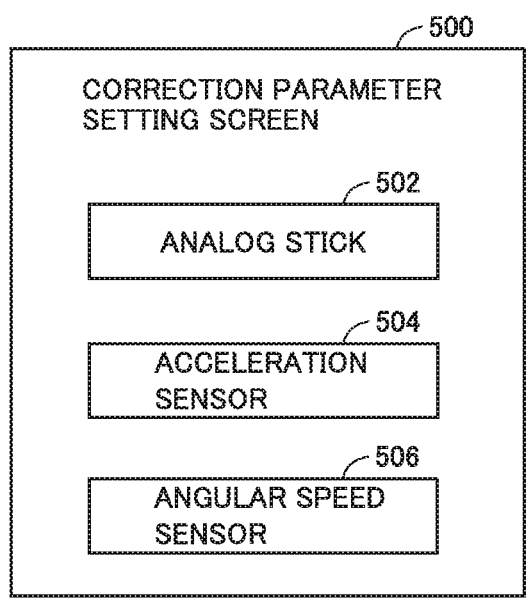
FIG. 14 is an example non-limiting diagram illustrating a correction parameter setting screen 500 based on the embodiment.

FIG. 14 is an example non-limiting diagram illustrating a correction parameter setting screen 500 based on the embodiment.

FIG. 14 shows correction parameter setting screen 500.

The correction parameter setting screen represents one example of a screen shown when correction parameter setting processing is indicated in a home menu. The home menu is provided to allow launch of a game application and various types of setting (correction parameter setting processing). For example, an icon for launching a game application is provided and the game application is launched by selecting the icon. An icon for performing correction parameter setting processing is also provided, and an application for the correction parameter setting processing is launched by selecting the icon and the correction parameter setting screen is shown.

Correction parameter setting screen 500 includes an analog stick button 502 for performing processing for setting a correction parameter for the analog stick, an acceleration sensor button 504 for performing processing for setting a correction parameter for the acceleration sensor, and an angular speed sensor button 506 for performing processing for setting a correction parameter for the angular speed sensor.

When correction parameter setting unit 204 accepts selection of analog stick button 502 in response to an instruction from the controller, it performs processing for setting a correction parameter for the analog stick. When correction parameter setting unit 204 accepts selection of acceleration sensor button 504 in response to an instruction from the controller, it performs processing for setting a correction parameter for the acceleration sensor. When correction parameter setting unit 204 accepts selection of angular speed sensor button 506 in response to an instruction from the controller, it performs processing for setting a correction parameter for the angular speed sensor.

Figure 15:
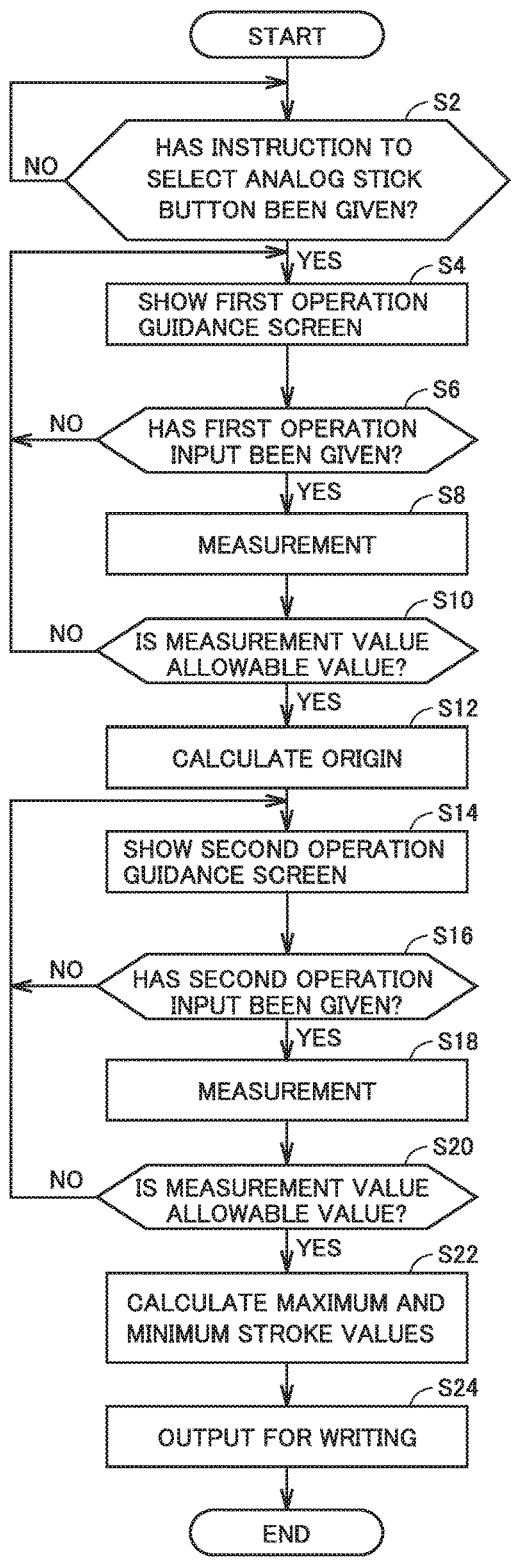
FIG. 15 is an example non-limiting flowchart illustrating processing for setting a correction parameter for the analog stick based on the embodiment.

FIG. 15 is an example non-limiting flowchart illustrating processing for setting a correction parameter for the analog stick based on the embodiment.

As shown in FIG. 15, correction parameter setting unit 204 determines whether or not analog stick button 502 has been selected (step S2). Specifically, whether or not an instruction to select analog stick button 502 has been given in correction parameter setting screen 500 is determined based on operation data from controller 3.

When correction parameter setting unit 204 determines in step S2 that analog stick button 502 has been selected (YES in step S2), a first operation guidance screen 602 is shown in display 12 (step S4).

Then, correction parameter setting unit 204 determines whether or not a first operation input has been given in accordance with first operation guidance screen 602 (step S6). Specifically, whether or not the first operation input designated in first operation guidance screen 602 has been given is determined based on operation data from controller 3.

When correction parameter setting unit 204 determines in step S6 that the first operation input has been given (YES in step S6), operation data is measured (step S8).

When correction parameter setting unit 204 determines in step S6 that the first operation input has not been given (NO in step S6), the process returns to step S4.

Then, correction parameter setting unit 204 determines whether or not a measurement value is an allowable value (step S10).

When correction parameter setting unit 204 determines in step S10 that the measurement value is the allowable value (YES in step S10), it calculates the origin (step S12).

When correction parameter setting unit 204 determines in step S10 that the measurement value is not the allowable value (NO in step S10), the process returns to step S4 and the first operation guidance screen is again shown on display 12. In this case, a message may be shown to invite a user to perform the first operation again.

Figure 16A:
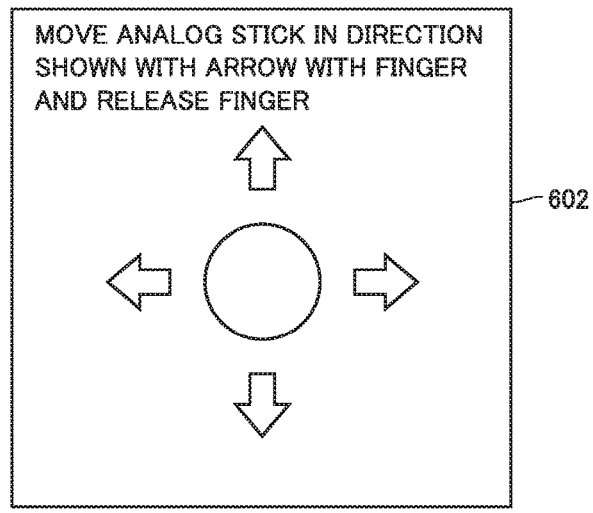
FIGS. 16A and 16B are example non-limiting diagrams illustrating operation guidance screens shown on a display 12 based on the embodiment.
Figure 16B:
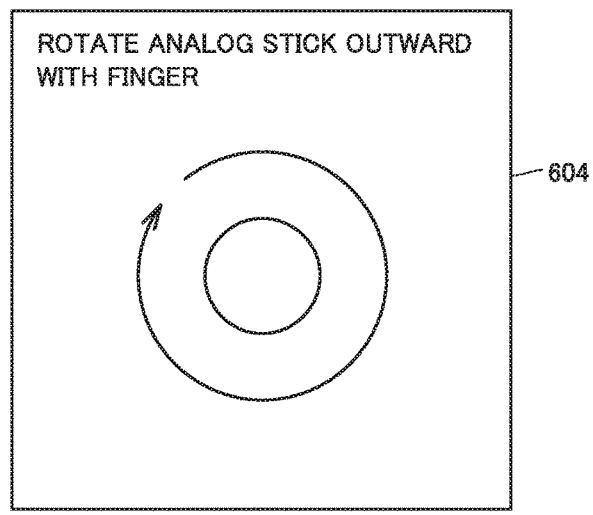

FIGS. 16A and 16B are example non-limiting diagrams illustrating operation guidance screens shown on display 12 based on the embodiment.

FIG. 16A shows first operation guidance screen 602. In first operation guidance screen 602, as to the first operation, arrows pointing to four directions of up, down, left, and right directions are shown, and a message "move analog stick in direction shown with arrow with finger and release finger" is shown.

The user is invited to move analog stick 32 of controller 3 in four directions shown with the arrows and to release his/her finger in accordance with the message.

Figure 17A:
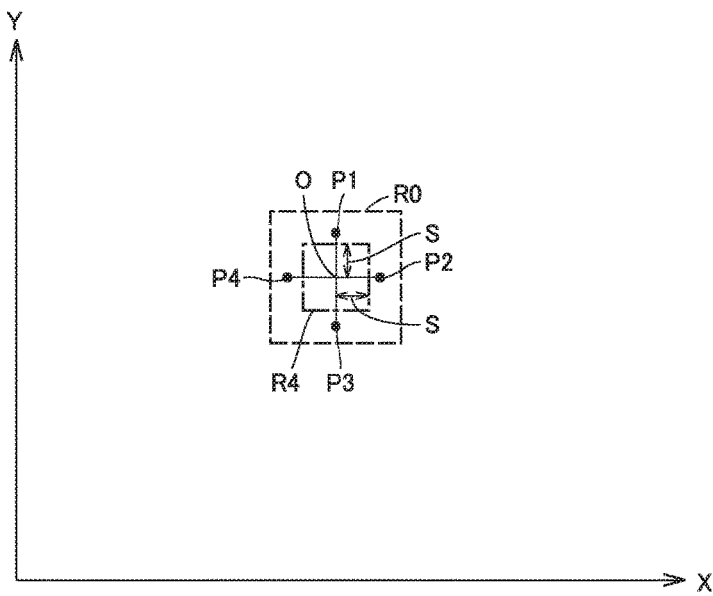
FIGS. 17A and 17B are example non-limiting diagrams illustrating calculation of a correction parameter value when a user operates the analog stick in accordance with the operation guidance screen based on the embodiment.
Figure 17B:
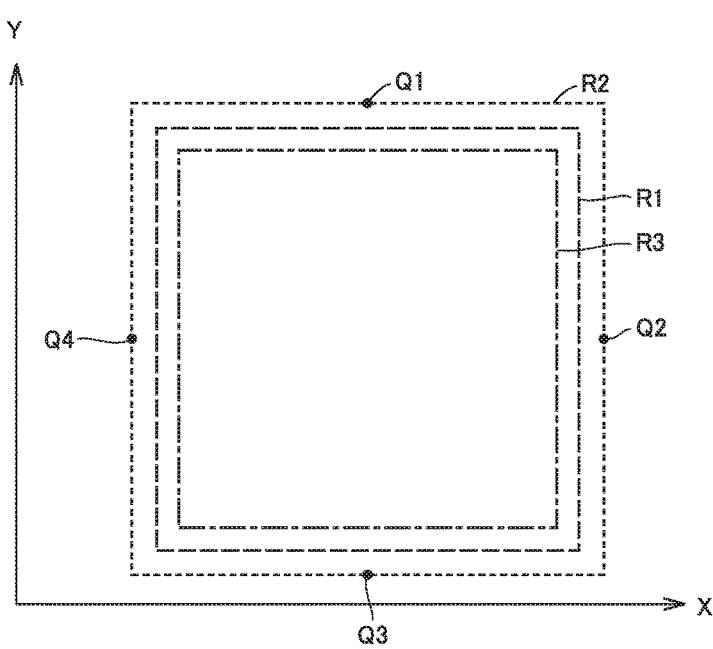

FIGS. 17A and 17B are example non-limiting diagrams illustrating calculation of a correction parameter value when a user operates the analog stick in accordance with the operation guidance screen based on the embodiment.

FIG. 17A shows a scheme for calculating a coordinate of the origin of analog stick 32.

As shown in FIG. 17A, in the present example, a two-dimensional coordinate defined by an X axis and a Y axis is shown. Measurement values (position coordinates) P1 to P4 measured on the two-dimensional coordinate at the time when the user moves analog stick 32 in four directions of up, down, left, and right directions with his/her finger and releases the finger so that a central shaft of analog stick 32 returns are shown.

A region R0 on the two-dimensional coordinate is a region set by an origin range 325 of the analog stick, which is included in model information 320 in the correction parameter information.

In the present example, correction parameter setting unit 204 determines whether or not a measurement value is included in region R0 designated by origin range 325. When correction parameter setting unit 204 determines that the measurement value is included in region R0 designated by origin range 325, it determines that the measurement value is the allowable value. When correction parameter setting unit 204 determines that the measurement value is not in region R0 designated by origin range 325, it determines that the measurement value is not the allowable value.

Correction parameter setting unit 204 sets a point of intersection between a line segment defined by measurement values P1 and P3 and a line segment defined by measurement values P2 and P4 as an origin coordinate O by way of example. A scheme for setting origin coordinate O is not limited as such.

A width S from origin coordinate O corresponds to central dead band width 322 of model information 320. A central dead band region R4 is set with origin coordinate O being defined as the center, by using a value for central dead band width 322.

Referring again to FIG. 15, then, correction parameter setting unit 204 has display 12 show a second operation guidance screen 604 (step S14).

Then, correction parameter setting unit 204 determines whether or not a second operation input has been given in accordance with second operation guidance screen 604 (step S16). Specifically, whether or not the second operation input designated in second operation guidance screen 604 has been given is determined based on operation data from controller 3.

When correction parameter setting unit 204 determines in step S16 that the second operation input has been given (YES in step S16), it measures operation data (step S18).

When correction parameter setting unit 204 determines in step S16 that the second operation input has not been given (NO in step S16), the process returns to step S14.

Then, correction parameter setting unit 204 determines whether or not a measurement value is an allowable value (step S20).

When correction parameter setting unit 204 determines in step S20 that the measurement value is the allowable value (YES in step S20), it calculates maximum and minimum stroke values (step S22).

When correction parameter setting unit 204 determines in step S20 that the measurement value is not the allowable value (NO in step S20), the process returns to step S14 and the correction parameter setting unit has display 12 show again the second operation guidance screen. In this case, a message may be shown to invite the user to perform again the second operation.

FIG. 16B shows second operation guidance screen 604. Second operation guidance screen 604 invites rotation of analog stick 32 in a direction shown with an arrow as to the second operation. A message "rotate analog stick outward with finger" is shown.

The user is invited to move and rotate outward analog stick 32 of controller 3 as shown with the arrow in accordance with the message.

FIG. 17B shows a scheme for calculating maximum and minimum stroke values of analog stick 32.

As shown in FIG. 17B, in the present example, a two-dimensional coordinate defined by an X axis and a Y axis is shown. Measurement values (position coordinates) Q1 to Q4 on the two-dimensional coordinate measured at the time when the user rotates analog stick 32 outward with his/her finger are shown. In the present example, a plurality of measurement values are obtained when analog stick 32 is rotated outward with a finger.

In the present example, at least four of a plurality of obtained measurement values are extracted. Specifically, measurement values Q2 and Q4 are measurement values having stroke maximum and minimum values on the X axis. Measurement values Q1 and Q3 are measurement values having stroke maximum and minimum values on the Y axis.

The stroke maximum and minimum values on the X axis and the Y axis are calculated based on the measurement values.

A stroke maximum region R2 on the two-dimensional coordinate is set based on the measurement values of the stroke maximum and minimum values.

A region R1 on the two-dimensional coordinate is a region set by an ensured stroke range 324 of the analog stick included in model information 320 of the correction parameter information.

In the present example, correction parameter setting unit 204 determines whether or not a measurement value extracted from the plurality of measurement values is located outside region R1 designated by ensured stroke range 324. When correction parameter setting unit 204 determines that the measurement value is not included in region R1 designated by ensured stroke range 324, it determines that the measurement value is the allowable value. When correction parameter setting unit 204 determines that the measurement value is within region R1 designated by ensured stroke range 324, it determines that the measurement value is not the allowable value.

Correction parameter setting unit 204 sets a region defined by multiplication of stroke maximum region R2 by an outer dead band coefficient α as a region R3. In the present example, a region between stroke maximum region R2 and region R3 is set as the outer dead band region.

Though correction parameter setting unit 204 sets by way of example the outer dead band region as the region between the stroke maximum region and the region defined by multiplication of the stroke maximum region by the outer dead band coefficient, a setting scheme is not limited thereto.

Referring again to FIG. 15, correction parameter setting unit 204 outputs the calculated origin coordinate and the maximum and minimum stroke values to writing unit 206 for writing of them into the controller (step S24). Then, the process ends (end).

Writing unit 206 transmits the origin coordinate and the maximum and minimum stroke values output from correction parameter setting unit 204 to controller 3.

Communication control unit 101 of controller 3 receives the write order as well as the origin coordinate and the maximum and minimum stroke values from writing unit 206.

Communication control unit 101 updates the correction parameter information stored in memory 102 in accordance with the write order. Specifically, a write flag (identification information) is stored in write flag data 314 of analog stick correction parameter value 310.

Communication control unit 101 has the origin coordinate as well as the maximum and minimum stroke values calculated in main body apparatus 2 stored as origin 316, maximum stroke value 315, and minimum stroke value 317.

Figure 18:
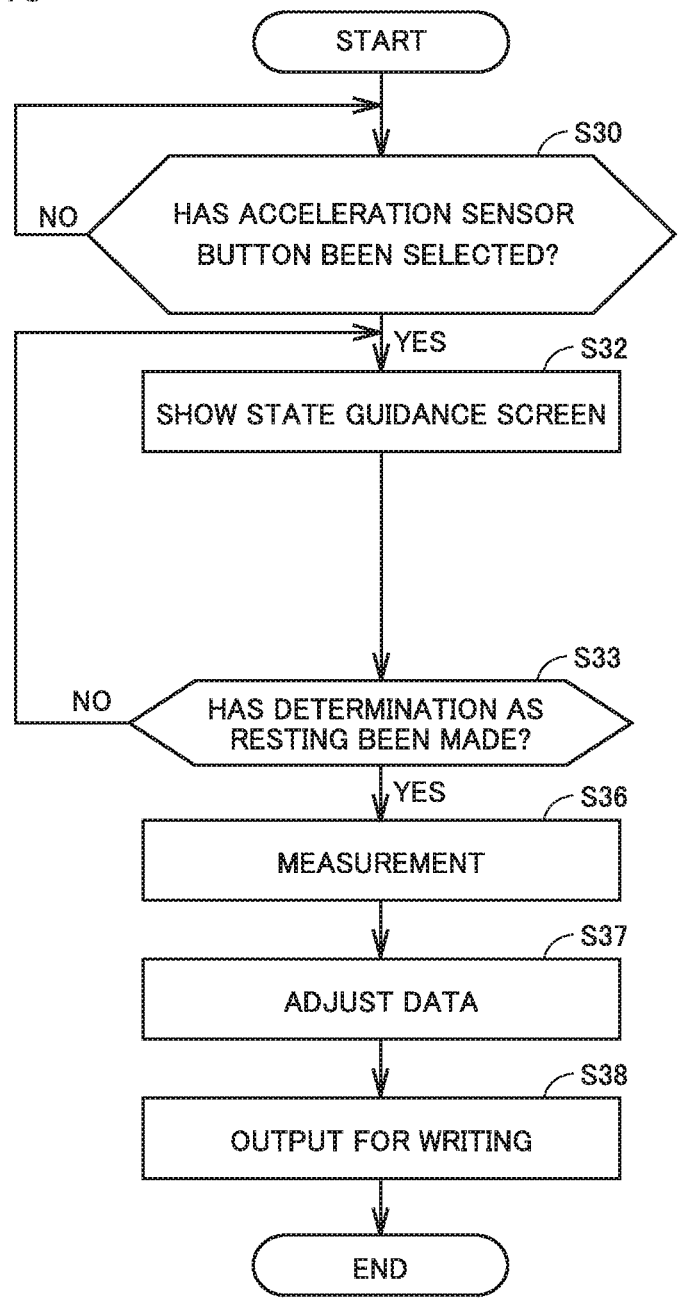
FIG. 18 is an example non-limiting flowchart illustrating processing for setting a correction parameter for an acceleration sensor based on the embodiment.

FIG. 18 is an example non-limiting flowchart illustrating processing for setting a correction parameter for the acceleration sensor based on the embodiment.

As shown in FIG. 18, correction parameter setting unit 204 determines whether or not acceleration sensor button 504 has been selected (step S30). Specifically, whether or not an instruction to select acceleration sensor button 504 has been given in correction parameter setting screen 500 is determined based on operation data from controller 3.

When correction parameter setting unit 204 determines in step S30 that acceleration sensor button 504 has been selected (YES in step S30), a resting state guidance screen 610 is shown on display 12 (step S32).

Then, correction parameter setting unit 204 determines whether or not the controller is rested (step S33). Specifically, whether or not sensor value from acceleration sensor 104 is stable is determined. When it is determined that the sensor value of acceleration sensor 104 is stable, determination as resting is made.

Then, when correction parameter setting unit 204 makes determination as resting (YES in step S33), it measures data of the acceleration sensor (step S36).

When correction parameter setting unit 204 makes determination as non-resting (NO in step S33), the process returns to step S32.

Figure 19:
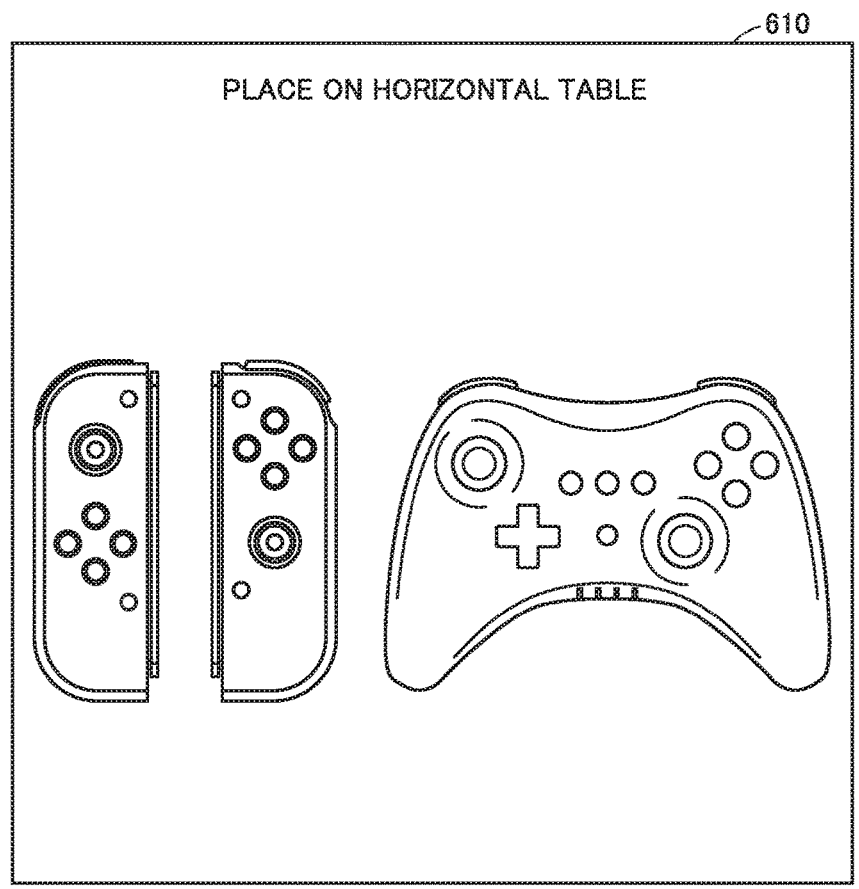
FIG. 19 is an example non-limiting diagram illustrating a resting state guidance screen 610 shown on display 12 based on the embodiment.

FIG. 19 is an example non-limiting diagram illustrating resting state guidance screen 610 shown on display 12 based on the embodiment.

FIG. 19 shows resting state guidance screen 610 and a message "place on horizontal table" together with various controllers.

A user is invited to place controller 3 on the horizontal table in accordance with the message.

In this state, data of the acceleration sensor is measured.

Referring again to FIG. 18, correction parameter setting unit 204 performs data adjustment processing (step S37).

Even when the controller is placed on the horizontal table, acceleration sensor 104 itself may not be horizontal owing to inclination of the housing of the controller. In the present example, in order to set a value for acceleration sensor 104 in a virtual horizontal state of the controller to 0 (reference value), acceleration sensor offset value 321 included in model information 320 is used. Acceleration sensor offset value 321 is adjustment data for obtaining the reference value in consideration of inclination of the housing.

In the present example, through data adjustment processing, the reference value for acceleration sensor 104 is calculated based on measured data of the acceleration sensor and acceleration sensor offset value 321.

Then, in order to write the calculated reference value for the acceleration sensor in the controller, correction parameter setting unit 204 outputs the reference value to writing unit 206 (step S38). Then, the process ends (end).

Writing unit 206 transmits the reference value output from correction parameter setting unit 204 to controller 3.

Communication control unit 101 of controller 3 receives a write order and the reference value from writing unit 206.

Communication control unit 101 updates correction parameter information stored in memory 102 in accordance with the write order. Specifically, a write flag (identification information) is stored in write flag data 304 of acceleration sensor correction parameter value 301.

Communication control unit 101 has the reference value transmitted from main body apparatus 2 stored as reference value data 306.

In the initial state, in game processing, inclination of controller 3 (inclination of acceleration sensor 104) as an operation input from the reference value is calculated with reference value data 302 as of the manufacturing process being defined as the reference, and game processing is performed based on an amount of command in accordance with the inclination.

When correction parameter setting processing is performed, in game processing, inclination of controller 3 (inclination of acceleration sensor 104) as an operation input from the reference value is calculated with reference value data 306 in accordance with correction parameter setting processing being defined as the reference, and game processing is performed based on an amount of command in accordance with the inclination.

Since processing for setting a correction parameter for the angular speed sensor is basically similar to the processing for setting a correction parameter for acceleration sensor 104, detailed description thereof will not be repeated.

Specifically, whether or not an instruction to select angular speed sensor button 506 has been given in correction parameter setting screen 500 is determined based on operation data from controller 3, and when an instruction to select angular speed sensor 506 has been given, processing for setting a correction parameter for the angular speed sensor is performed. As in the case of the acceleration sensor, data of the angular speed sensor in a resting state is measured. Then, writing unit 206 transmits a write order and a measured sensor value for the angular speed sensor to controller 3. Communication control unit 101 of controller 3 updates correction parameter information stored in memory 102 in accordance with the write order. Specifically, a write flag (identification information) is stored in write flag data 334 of angular speed sensor correction parameter value 331. Communication control unit 101 has the sensor value for the angular speed sensor stored as reference value data 336.

With the data, a value for angular speed sensor 105 in a virtual resting state of the controller can be set to 0 (reference value).

Model information is not used for angular speed sensor 105.

In the initial state, in game processing, a motion of controller 3 (a value for angular speed sensor 105) as an operation input from the reference value is calculated with reference value data 332 as of the manufacturing process being defined as the reference, and game processing is performed based on an amount of command in accordance with a motion operation.

When correction parameter setting processing is performed, in game processing, a motion of controller 3 (a value for angular speed sensor 105) as an operation input from the reference value is calculated with reference value data 336 in accordance with correction parameter setting processing being defined as the reference, and game processing is performed based on an amount of command in accordance with a motion operation.

[G: Game Processing]

Figure 20:
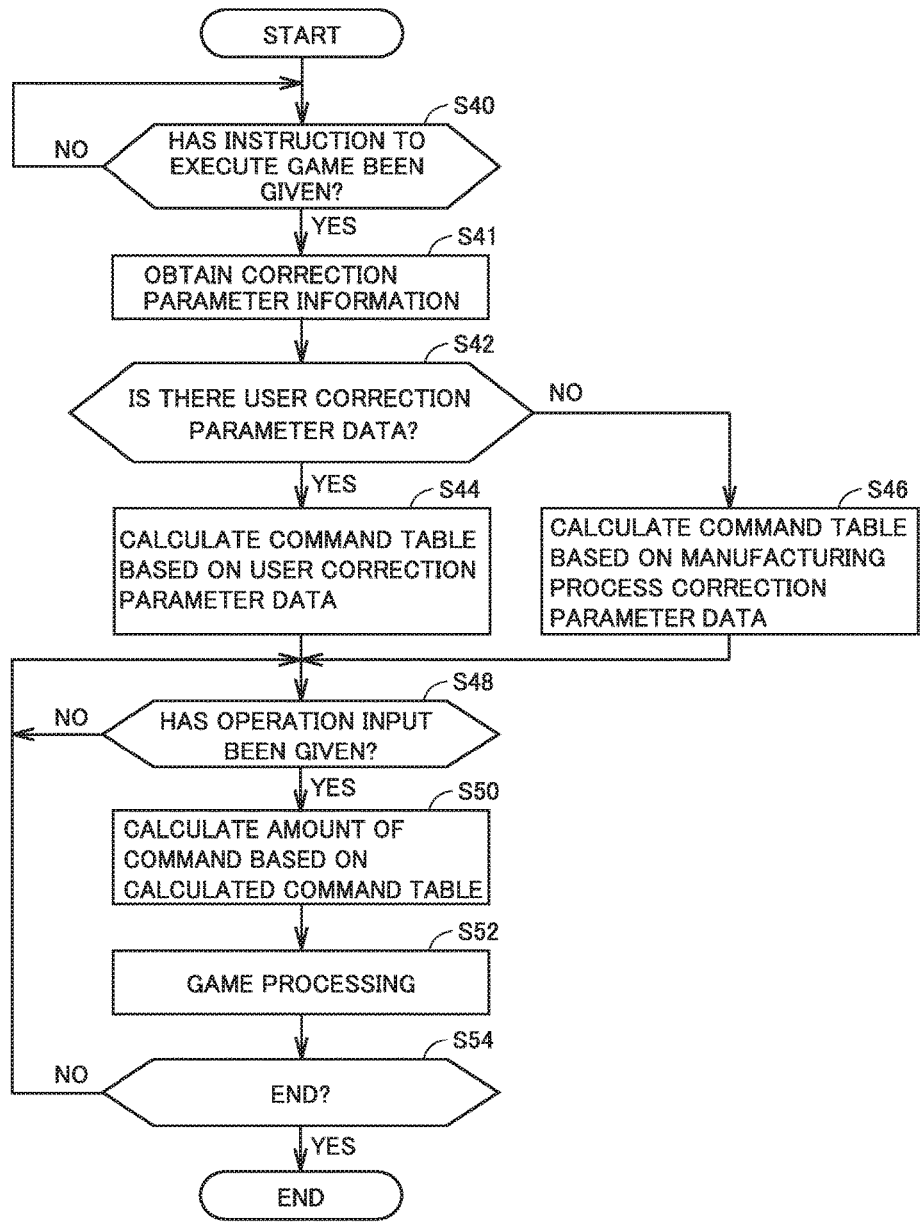
FIG. 20 is an example non-limiting flowchart illustrating game processing performed by game device 1 based on the embodiment.

FIG. 20 is an example non-limiting flowchart illustrating game processing performed by game device 1 based on the embodiment.

Each step shown in FIG. 20 is typically performed by execution of a program by CPU 81 of main body apparatus 2.

Referring to FIG. 20, CPU 81 determines whether or not execution of game processing has been indicated (step S40). Game execution processing unit 200 determines whether or not start of game processing has been indicated.

When CPU 81 determines that execution of game processing has been indicated (YES in step S40), it obtains correction parameter information (step S41). Specifically, obtaining unit 203 obtains correction parameter information stored in memory 102 of controller 3.

Then, CPU 81 determines whether or not there is user correction parameter data (step S42). Specifically, selection unit 202 determines whether or not correction parameter information obtained by obtaining unit 203 includes user correction parameter data.

When CPU 81 determines in step S42 that there is user correction parameter data (YES in step S42), it calculates a command table based on the user correction parameter data (step S44). Processing unit 201 calculates a command table based on the user correction parameter data selected by selection unit 202. By calculating the command table, processing for correcting operation data as set by a user (calibration processing) can be performed.

When CPU 81 determines in step S42 that there is no user correction parameter data (NO in step S42), it calculates a command table based on manufacturing process correction parameter data (step S46). Processing unit 201 calculates a command table based on manufacturing process correction parameter data selected by selection unit 202. By calculating the command table, processing for correcting operation data as set in the manufacturing process (calibration processing) can be performed.

Figure 21:
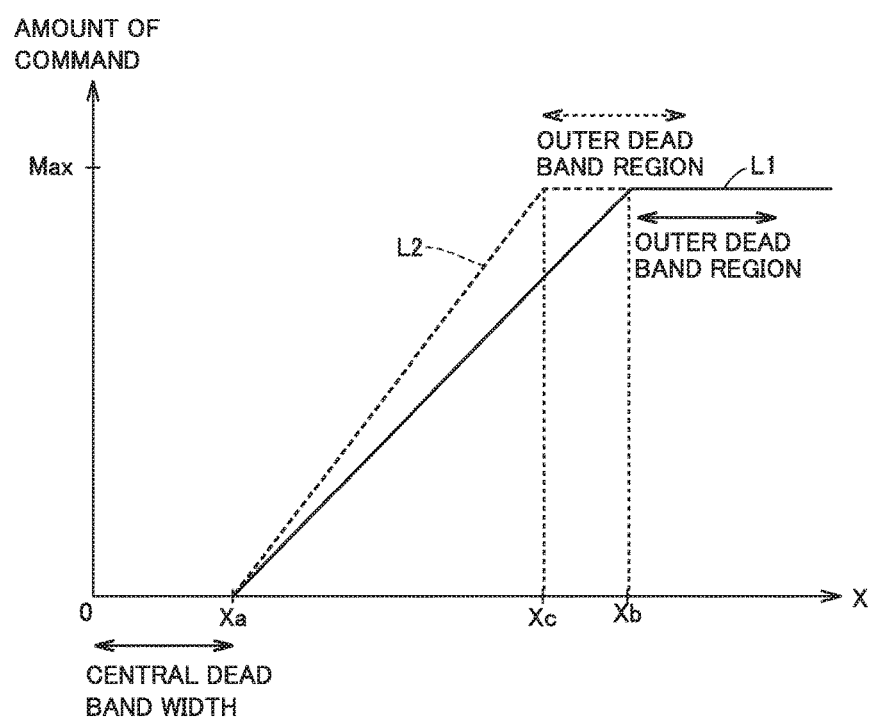
FIG. 21 is an example non-limiting conceptual diagram illustrating a command table for the analog stick based on the embodiment.

FIG. 21 is an example non-limiting conceptual diagram illustrating a command table for the analog stick based on the embodiment.

As shown in FIG. 21, in the present example, two command tables L1 and L2 are provided. Command table L1 is based on manufacturing process correction parameter data. Command table L2 is based on user correction parameter data.

In the present example, a length by Xa in the direction of the X axis from origin O is set as the central dead band width.

In command table L1, a region beyond a length of Xb in the direction of the X axis is set as the outer dead band region. In command table L2, a region beyond a length of Xc in the direction of the X axis is set as the outer dead band region.

In the present example, stroke maximum region R2 is set as described with reference to FIG. 17B based on maximum stroke value 311, origin 312, and minimum stroke value 313 as of the manufacturing process. Then, region R3 is set based on outer dead band coefficient $\alpha$ of model information 320.

The region between stroke maximum region R2 and region R3 is set as the outer dead band region. In accordance with the setting, an outer dead band limit position Xb in the direction of the X axis is set. Command table L1 is set such that an amount of command makes linear transition between an amount of command Max at outer dead band limit position Xb and amount of command 0 at a central dead band limit position Xa.

Similarly, stroke maximum region R2 is set as described with reference to FIG. 17B based on maximum stroke value 315, origin 316, and minimum stroke value 317 in accordance with the correction parameter setting processing. Then, region R3 is set based on outer dead band coefficient $\alpha$ of model information 320.

The region between stroke maximum region R2 and region R3 is set as the outer dead band region. In accordance with the setting, a central dead band limit position Xc in the direction of the X axis is set. Command table L2 is set such that an amount of command makes linear transition between amount of command Max at outer dead band limit position Xc and amount of command 0 at central dead band limit position Xa.

Then, CPU 81 determines whether or not an operation input has been given (step S48). Processing unit 201 determines whether or not an operation input from the controller has been given.

When CPU 81 determines in step S48 that an operation input has been given (YES in step S48), it calculates an amount of command based on the calculated command table (step S50). When processing unit 201 determines that an operation input has been given, it calculates an amount of command based on any one of calculated command tables L1 and L2.

Then, CPU 81 performs game processing based on the calculated amount of command (step S52). Specifically, processing unit 201 generates a game image in accordance with the calculated amount of command. Then, an updated output is given to display 12 in accordance with the generated game image.

Then, CPU 81 determines whether or not end of game processing has been indicated (step S54). Processing unit 201 determines whether or not an instruction to end has been given.

When CPU 81 determines in step S54 that end of game processing has been indicated (YES in step S54), the process ends (end).

When CPU 81 determines in step S54 that end of game processing has not been indicated (NO in step S54), the process returns to step S48 and the processing above is repeated.

Game processing based on the command table for the analog stick has been described in the flow above.

This is basically also applicable to the acceleration sensor. As described above, when there is no write flag data 304, reference value data 302 as of the manufacturing process is selected. When there is write flag data 304, reference value data 306 in accordance with the correction parameter setting processing is selected. In game processing, inclination of controller 3 (inclination of acceleration sensor 104) as an operation input from the selected reference value is calculated and game processing is performed in accordance with an amount of command in accordance with the inclination.

This is basically also applicable to the angular speed sensor. As described above, when there is no write flag data 334, reference value data 332 as of the manufacturing process is selected. When there is write flag data 334, reference value data 336 in accordance with the correction parameter setting processing is selected. In game processing, a motion of controller 3 as an operation input from the selected reference value is calculated and game processing is performed in accordance with an amount of command in accordance with the motion.

An input onto controller 3 resulting from combined operations of at least two of analog stick 32, acceleration sensor 104, and angular speed sensor 105 is also similarly applicable.

Though controller 3 has mainly been described above, the description is also similarly applicable to controller 4.

The description is also similarly applicable to accessory controller 401.

In accessory controller 401, a plurality of analog sticks of analog sticks 411 and 412 are provided. In this case, a plurality of manufacturing process correction parameter values and a plurality of user correction parameter values in correspondence with the plurality of respective analog sticks are stored as the correction parameter information in the memory of accessory controller 401. In model information as well, correction parameters for respective corresponding models of the plurality of analog sticks are stored.

With the scheme based on the present embodiment, correction parameter information specific to controller 3 is stored in memory 102 of controller 3. Then, the correction parameter information is transmitted from controller 3 to main body apparatus 2 and executed in game processing. Therefore, main body apparatus 2 can perform highly accurate calibration processing in game processing in accordance with individual correction parameter information stored in memory 102 of controller 3.

Correction parameter information includes model information for each model (type) of the controller. Therefore, even when the model of the controller is updated, the model information is simply updated and it is not necessary to manage a model of the controller in main body apparatus 2.

Since it is not necessary to perform complicated operational processing such as updating of a software program of main body apparatus 2 for communicating with a controller in response to update of the controller, convenience is improved.

An example in which a button for performing processing for setting a correction parameter for each of acceleration sensor 104 and angular speed sensor 105 is provided in correction parameter setting screen 500 so that correction parameter setting processing is performed has been described above. An operation performed by a user, however, is the same. Therefore, correction parameter setting processing for each sensor can also simultaneously be performed in one setting processing. With such a scheme, correction parameter setting processing can be performed in a simplified manner.

An application executable on a personal computer may be provided as a program in the present embodiment. The program according to the present embodiment may be incorporated as some functions of various application programs executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A game system comprising:
a main body apparatus; and
a game controller,
the game controller including:
an analog stick,
a memory configured to store correction parameter information including a first manufacturing process correction parameter value determined in a manufacturing process in connection with the analog stick, a first user correction parameter value determined in accordance with an operation by a user onto the analog stick in connection with the analog stick, and a first model adjustment value corresponding to a model of the game controller in connection with the analog stick, and
a first control circuit configured to transmit the correction parameter information stored in the memory to the main body apparatus,
the main body apparatus including a second control circuit, wherein
the second control circuit is configured to:
select any of the first manufacturing process correction parameter value and the first user correction parameter value included in the transmitted correction parameter information as a first correction parameter value, and
perform game processing based on the first correction parameter value, the first model adjustment value, and input data from the analog stick.

2. The game system according to claim 1, wherein
the second control circuit is configured to preferentially select the first user correction parameter value when the correction parameter information includes the first user correction parameter value.

3. The game system according to claim 2, wherein
the second control circuit is configured to determine whether there is identification information indicating that the correction parameter information includes the first user correction parameter value and select the first user correction parameter value included in the correction parameter information when the second control circuit determines that there is the identification information.

4. The game system according to claim 1, wherein
the game controller further includes an acceleration sensor,
the memory is configured to store a second manufacturing process correction parameter value determined in the manufacturing process in connection with the acceleration sensor and a second user correction parameter value determined in accordance with an operation by the user onto the game controller in connection with the acceleration sensor as a part of the correction parameter information,
the second control circuit is configured to:
select any of the second manufacturing process correction parameter value and the second user correction parameter value included in the transmitted correction parameter information as a second correction parameter value, and
perform the game processing also based on the second correction parameter value and input data from the acceleration sensor.

5. The game system according to claim 1, wherein
the game controller further includes an angular speed sensor,
the memory is configured to store a third manufacturing process correction parameter value determined in the manufacturing process in connection with the angular speed sensor and a third user correction parameter value determined in accordance with an operation by the user onto the game controller in connection with the angular speed sensor as a part of the correction parameter information,
the second control circuit is configured to:
select any of the third manufacturing process correction parameter value and the third user correction parameter value included in the transmitted correction parameter information as a third correction parameter value, and
perform the game processing also based on the third correction parameter value and input data from the angular speed sensor.

6. The game system according to claim 1, wherein
the first model adjustment value comprises information for setting a central dead band region and an outer dead band region.

7. The game system according to claim 1, wherein
the second control circuit is configured to write the first user correction parameter value into the memory of the game controller.

8. A game controller comprising:
an analog stick;
an acceleration sensor;
a memory; and
a communication control circuit configured to communicate with a main body apparatus,
the memory being configured to store correction parameter information including a first manufacturing process correction parameter value determined in a manufacturing process in connection with the analog stick, a first user correction parameter value determined in accordance with an operation by a user onto the analog stick in connection with the analog stick, and a first model adjustment value corresponding to a model of the game controller in connection with the analog stick as well as a second manufacturing process correction parameter value determined in the manufacturing process in connection with the acceleration sensor, a second user correction parameter value determined in accordance with an operation by the user onto the game controller in connection with the acceleration sensor, and a second model adjustment value corresponding to the model of the game controller in connection with the acceleration sensor, and
the communication control circuit being configured to transmit the correction parameter information stored in the memory to the main body apparatus when the communication control circuit is connected to the main body apparatus, receive at least any of the first user correction parameter value and the second user correction parameter value to be stored in the memory from the main body apparatus, and transmit operation data from at least any of the analog stick and the acceleration sensor to the main body apparatus when the main body apparatus performs game processing.

9. The game controller according to claim 8, wherein the first model adjustment value includes information for setting a central dead band region.

10. The game controller according to claim 8, wherein the first model adjustment value includes information for setting an outer dead band region.

11. The game controller according to claim 8, wherein the game controller comprises a plurality of analog sticks, and the memory is configured to store a plurality of first manufacturing process correction parameter values determined in the manufacturing process in connection with the plurality of analog sticks, respectively, a plurality of first user correction parameter values determined in accordance with operations by a user onto the plurality of analog sticks in connection with the plurality of analog sticks, respectively, and a plurality of first model adjustment values for the model of the game controller for the plurality of analog sticks in connection with the plurality of analog sticks, respectively.

12. The game controller according to claim 8, wherein the game controller further comprises an angular speed sensor, the memory is configured to store a third manufacturing process correction parameter value determined in the manufacturing process in connection with the angular speed sensor and a third user correction parameter value determined in accordance with an operation by the user onto the game controller in connection with the angular speed sensor as a part of the correction parameter information, and the communication control circuit is configured to receive at least any of the first user correction parameter value, the second user correction parameter value, and the third user correction parameter value to be stored in the memory from the main body apparatus and transmit operation data from at least any of the analog stick, the acceleration sensor, and the angular speed sensor to the main body apparatus when the main body apparatus performs game processing.

\* \* \* \* \*